(12) United States Patent
West et al.

(10) Patent No.: US 12,096,723 B2
(45) Date of Patent: Sep. 24, 2024

(54) SELF-OPENING AIRTIGHT ROOF VENT SYSTEM FOR GRAIN STORAGE DEVICES

(71) Applicant: Sukup Manufacturing Co., Sheffield, IA (US)

(72) Inventors: Connor Lee West, Thornton, IA (US); Bradley Allan Poppen, Sheffield, IA (US); Andrew Joseph Sauerbrei, Clear Lake, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 604 days.

(21) Appl. No.: 17/346,373

(22) Filed: Jun. 14, 2021

(65) Prior Publication Data

US 2021/0392820 A1  Dec. 23, 2021

Related U.S. Application Data

(60) Provisional application No. 63/040,054, filed on Jun. 17, 2020.

(51) Int. Cl.
*A01F 25/22* (2006.01)

(52) U.S. Cl.
CPC .................. *A01F 25/22* (2013.01)

(58) Field of Classification Search
CPC ....... A01K 1/0058; A01F 25/22; E04D 13/17; F24F 2221/16; F24F 7/02
USPC ......................................... 454/178, 250, 366
See application file for complete search history.

(56) References Cited

U.S. PATENT DOCUMENTS

| | | | | |
|---|---|---|---|---|
| 725,994 | A * | 4/1903 | Sharp ................. | B61D 27/0027 454/89 |
| 2,211,367 | A * | 8/1940 | Davey ....................... | F24F 7/02 454/107 |
| 3,516,197 | A * | 6/1970 | Lyons ................. | E04D 13/0351 49/7 |
| 3,738,253 | A * | 6/1973 | Jentoft ..................... | F24F 7/02 137/72 |
| 4,090,437 | A * | 5/1978 | Bogaert .................. | E05F 1/002 49/7 |
| 4,164,106 | A * | 8/1979 | Klosz .................. | E04D 13/0325 52/72 |
| 4,192,385 | A * | 3/1980 | Pierce .................... | A62C 5/022 169/56 |
| 4,798,410 | A * | 1/1989 | Weller ................... | B60J 7/0435 296/217 |
| 11,460,201 | B2 * | 10/2022 | Daniels, II ............... | F24F 11/30 |

(Continued)

*Primary Examiner* — Ko-Wei Lin
(74) *Attorney, Agent, or Firm* — BrownWinick Law Firm; Christopher A. Proskey

(57) ABSTRACT

A roof vent system for a grain storage device is disclosed. A roof vent including a lid is operatively connected to the roof panel adjacent the opening. The lid is configured to move between an open position and a closed position. A bias member configured to apply an upward bias force to the lid to automatically move the lid to the open position. A control lever that is movable between an upper position and a lower position. The control lever is operably connected to the lid by a pull. When control lever is moved to the lower position with a force greater than the bias force of the bias member, the lid is moved to the closed position. A sealing member attached to the lid is configured to provide a seal between the lid and the roof panel when the lid is moved to the closed position.

35 Claims, 31 Drawing Sheets

(56) References Cited

U.S. PATENT DOCUMENTS

| | | | | |
|---|---|---|---|---|
| 2003/0162490 A1* | 8/2003 | Klesing | .................. | B60H 1/245 |
| | | | | 454/137 |
| 2006/0172696 A1* | 8/2006 | Cook | .................... | E04D 13/174 |
| | | | | 454/365 |
| 2010/0009620 A1* | 1/2010 | Kawato | .............. | B60H 1/00849 |
| | | | | 454/241 |
| 2012/0178356 A1* | 7/2012 | Waldner | ............... | A01K 1/0058 |
| | | | | 454/260 |
| 2013/0273827 A1* | 10/2013 | Waldner | ............... | A01K 1/0047 |
| | | | | 454/260 |
| 2015/0140916 A1* | 5/2015 | Bickel | ................... | B60H 1/262 |
| | | | | 454/145 |
| 2016/0252247 A1* | 9/2016 | Thomas | ................... | F23J 13/08 |
| | | | | 454/4 |
| 2019/0331355 A1* | 10/2019 | Daniels, II | ................ | F24F 7/02 |

\* cited by examiner

SELF-OPENING AIRTIGHT ROOF VENT SYSTEM FOR GRAIN STORAGE DEVICES

PRIOR RELATED APPLICATIONS

This application claims priority to U.S. Provisional Patent Application No. 63/040,054 filed Jun. 17, 2020, and titled SELF-OPENING AIRTIGHT ROOF VENT SYSTEM FOR GRAIN STORAGE DEVICES, which is hereby fully incorporated by reference herein.

FIELD OF THE DISCLOSURE

This disclosure relates to grain storage devices used in agriculture. More specifically and without limitation, this disclosure relates to a self-opening airtight roof vent system and method of use for grain storage devices such as grain bins.

OVERVIEW

Grain storage devices are massive structures used to store bulk flowable grain products such as corn, soybeans, wheat, rice, nuts, pistachios, or any other grain or agricultural products or other material. One common form of grain storage devices is what are known as grain bins.

For simplicity purposes, reference is made herein to grain bins as one of countless examples of grain storage devices. However, the disclosure is not intended to be limited to grain bins and instead the disclosure is intended to apply to all grain storage devices. As such, unless specifically stated otherwise, reference to a grain bin is intended to include all forms of grain storage devices.

Similarly, for simplicity purposes, reference is made herein to grain. However, the disclosure is not intended to be limited to grain. Instead the disclosure is intended to apply to corn, soybeans, wheat, rice, nuts, popcorn, pistachios, small grains, large grains, unprocessed grains, processed grains, foodstuffs, unprocessed foodstuffs, processed foodstuffs, other commodities, or any other grain or agricultural products or other flowable material. As such, unless specifically stated otherwise, reference to grain is intended to include all forms of corn, soybeans, wheat, rice, nuts, popcorn, pistachios, small grains, large grains, unprocessed grains, processed grains, foodstuffs, unprocessed foodstuffs, processed foodstuffs, other commodities, or any other grain or agricultural products or other material.

Conventional grain bins are generally formed in a cylindrical shape with a corrugated sidewall covered by a peaked roof formed by a plurality of roof panels. Grain bins vary in height (ranging from twenty feet high to over a hundred and fifty feet high), and diameter, (ranging from eighteen feet in diameter to over a hundred and fifty feet in diameter). The storage capacity of modern grain bins can range anywhere from a few thousand bushels to well over a million bushels.

Grain bins are often used to store grain for long periods of time. To ensure the stability of bulk grain during long-term storage the moisture level of the grain is closely monitored and controlled. Similarly, to ensure the stability of bulk grain during long-term storage air flow in and out of the grain bin is controlled. This is particularly important when conditioning various grains or products such as through blowing, drying, humidifying, fumigation or other processes.

Using fumigation as one example, during fumigation it is important to seal the grain bin off in an airtight, completely airtight, or mostly airtight manner to ensure that the gases within the grain bin are closely controlled. To be clear, the term airtight when used herein is intended to mean sealed in a manner that prevents the flow of most air or gas through the seal that is formed. However, the term airtight is intended to mean that some air or gas can flow through the seal that is formed. As such, the term airtight is akin to the term mostly airtight. Instead, the term completely airtight herein is intended to mean that no air or gas can flow through the seal that is formed (e.g., a hermetic seal).

However, during other stages in the grain conditioning process, it is necessary to have a free flow of air through the grain bin and through the grain stored in the grain bin. As an example, this often occurs for a period of time after the grain is first placed in the grain bin to ensure that the bulk of grain reaches an equilibrium temperature and/or moisture, and after fumigation so as to release the conditioning gasses.

However, presently there is no convenient, efficient and secure manner of converting a grain bin from an open or vented condition, for drying and conditioning, to a sealed, airtight, or completely airtight condition for fumigation and other conditioning steps.

There is additionally a need for a roof vent system that is easy and convenient to use. Current roof vent systems typically utilize two pulls to open and close the roof vent. For instance, pulling one pull causes the roof vent to open and pulling the other pull causes the roof vent to close. However, such two pull systems are troublesome and difficult to use. For example, the pulls can easily become tangled together, particularly on tall grain bins. As another example, it can be difficult to remember which pull is used to open the vent and which is used to close the vent. This confusion is exasperated as it can be difficult if not impossible to visually observe the vent from the ground to tell if the vent is open or closed due to the height of the grain bin.

Therefore, for all the reasons stated above, and the reasons stated below, there is a need in the art for an improved self-opening roof vent system for grain storage devices that allows a grain bin to convert from an open or vented condition to a sealed, airtight and/or completely airtight condition.

Thus, it is a primary object of the disclosure to provide a self-opening airtight and/or completely airtight roof vent system for grain storage devices that improves upon the state of the art.

Another object of the disclosure is to provide a roof vent system that is durable.

Yet another object of the disclosure is to provide a roof vent system that is easy to manufacture.

Another object of the disclosure is to provide a roof vent system that is relatively inexpensive.

Yet another object of the disclosure is to provide a roof vent system that has a robust design.

Another object of the disclosure is to provide a roof vent system that is high quality.

Yet another object of the disclosure is to provide a roof vent system that is easy to install.

Another object of the disclosure is to provide a roof vent system that can be installed using conventional equipment and tools.

Yet another object of the disclosure is to provide a roof vent system that prevents entry of water.

Another object of the disclosure is to provide a roof vent system that reduces grain spoilage.

Yet another object of the disclosure is to provide a roof vent system that reduces grain bin corrosion.

Another object of the disclosure is to provide a roof vent system that facilitates treatment of grain with gases.

Yet another object of the disclosure is to provide a roof vent system that can be used with any grain bin.

Another object of the disclosure is to provide a roof vent system that extends the useful life of a grain bin.

Yet another object of the disclosure is to provide a roof vent system that has a long useful life.

Another object of the disclosure is to provide a roof vent system that is easy to use.

Yet another object of the disclosure is to provide a roof vent system that uses a single pull for opening and closing the roof vent. These and other objects, features, or advantages of the disclosure will become apparent from the specification, figures and claims.

SUMMARY OF THE DISCLOSURE

In one or more arrangements, a roof vent system for a grain storage device is provided. The system includes a roof panel having an opening therein. A roof vent is positioned in the opening and connected to the roof panel. The roof vent includes a lid operatively connected to the roof panel adjacent the opening. The lid is configured to move between an open position, wherein the opening in the roof panel is uncovered by the lid, and a closed position, wherein the opening in the roof panel is covered by the lid. A bias member is operatively connected to the roof panel and the lid. The bias member is configured to apply an upward bias force to the lid to automatically move the lid to the open position. In one or more arrangements, the system includes a control lever that is movable between an upper position and a lower position. One end of a pull is operably connected to the control lever and a second end of the pull is operably connected to the lid. When control lever is moved to the lower position with a force greater than the bias force of the bias member, the lid is moved to the closed position.

In one or more arrangements, a sealing member is attached to bottom surface of the lid. The sealing member is configured to provide a seal between the lid and the roof panel when the lid is moved to the closed position. In some arrangements, the sealing member is configured to provide an airtight seal between the lid and the roof panel when the lid is moved to the closed position. In some arrangements, the sealing member is configured to provide a completely airtight seal between the lid and the roof panel when the lid is moved to the closed position.

DETAILED DESCRIPTION OF THE DISCLOSURE

Figure 1:
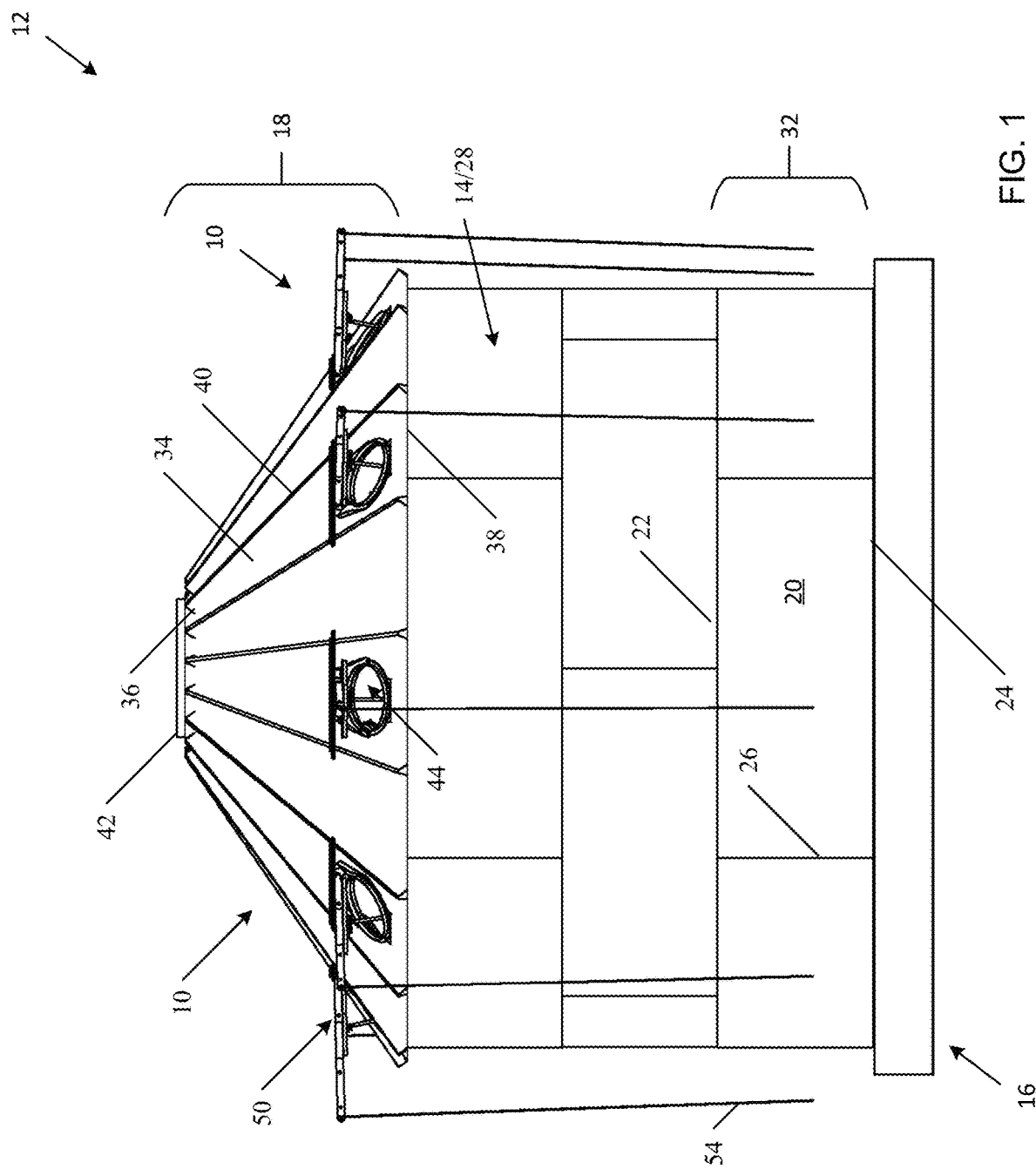
FIG. 1 is an elevation view of a grain bin having a set of roof vents, consistent with one or more embodiments; the view showing the grain bin having a sidewall formed of a plurality of sheets that are connected to one another at seams that form a plurality of vertically stacked rings; the view showing a roof formed of a plurality of panels connected by overlapping ribs with a plurality of the panels having the roof vents; the view showing the roof vents with the lids in an open position.
Figure 2:
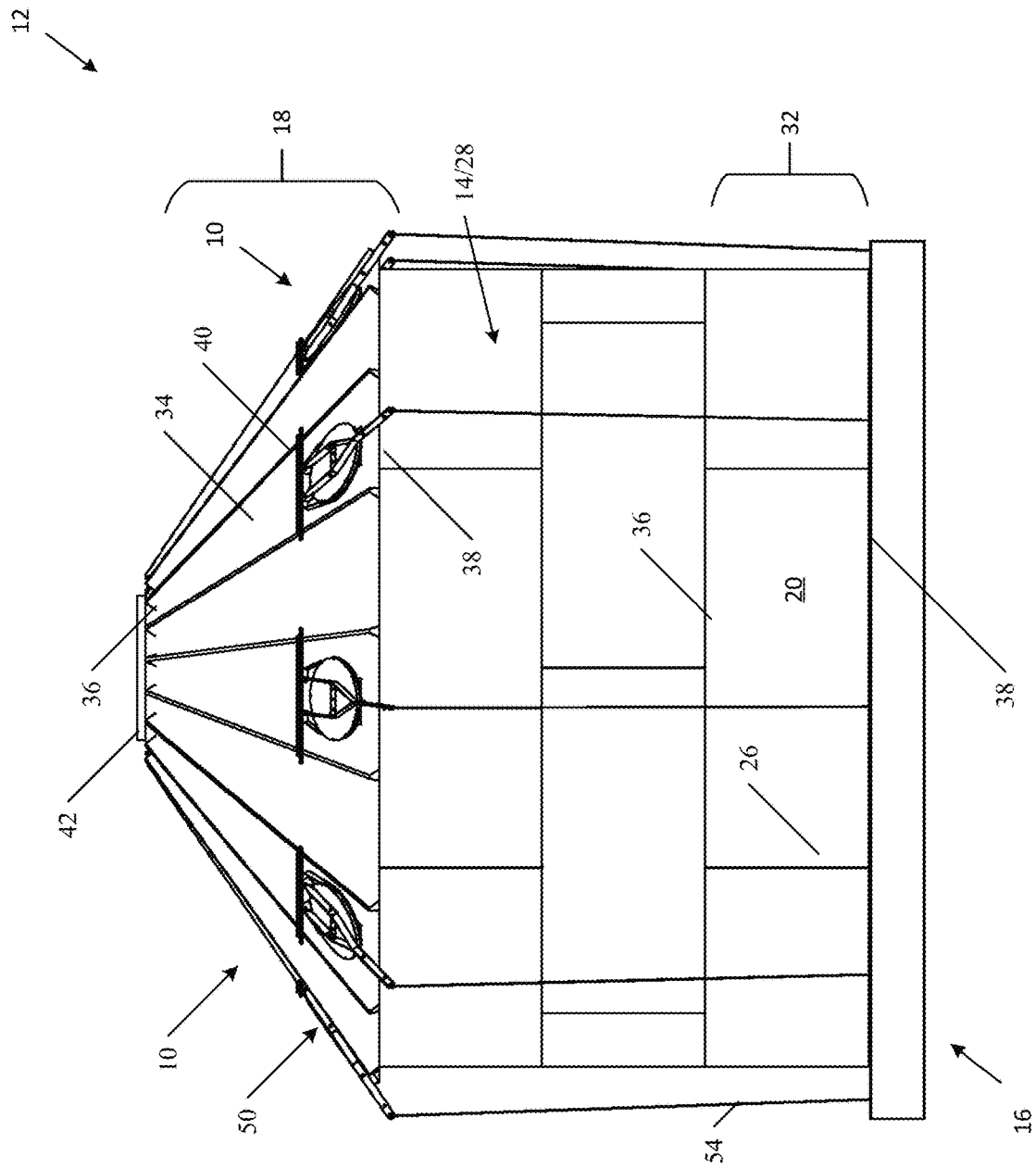
FIG. 2 is an elevation view of a grain bin shown in FIG. 1; the view showing the roof vents in a closed position.
Figure 3:
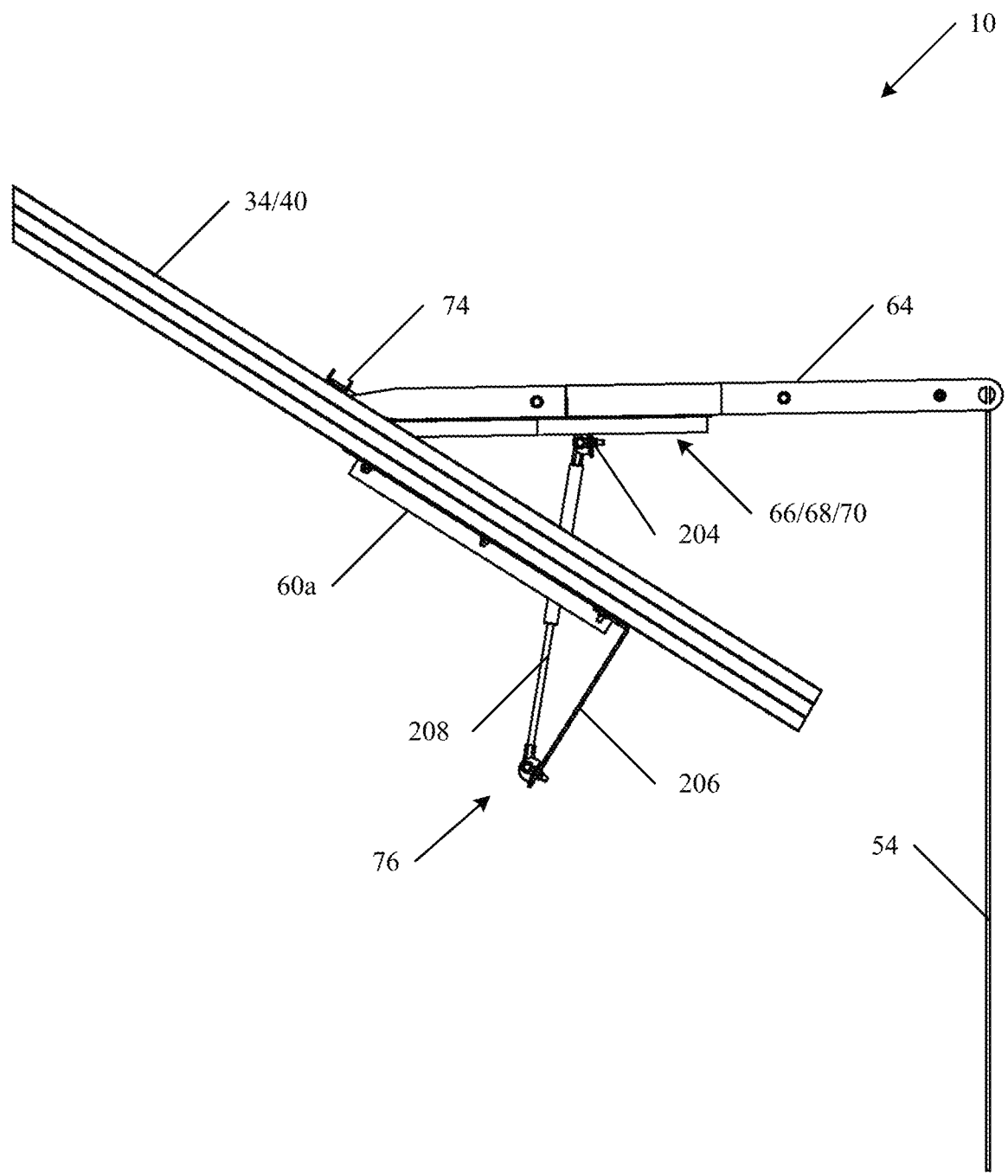
FIG. 3 is a left side view of a roof panel having a roof vent, in accordance with one or more embodiments; the view showing the roof vent with the lid in an open position.
Figure 4:
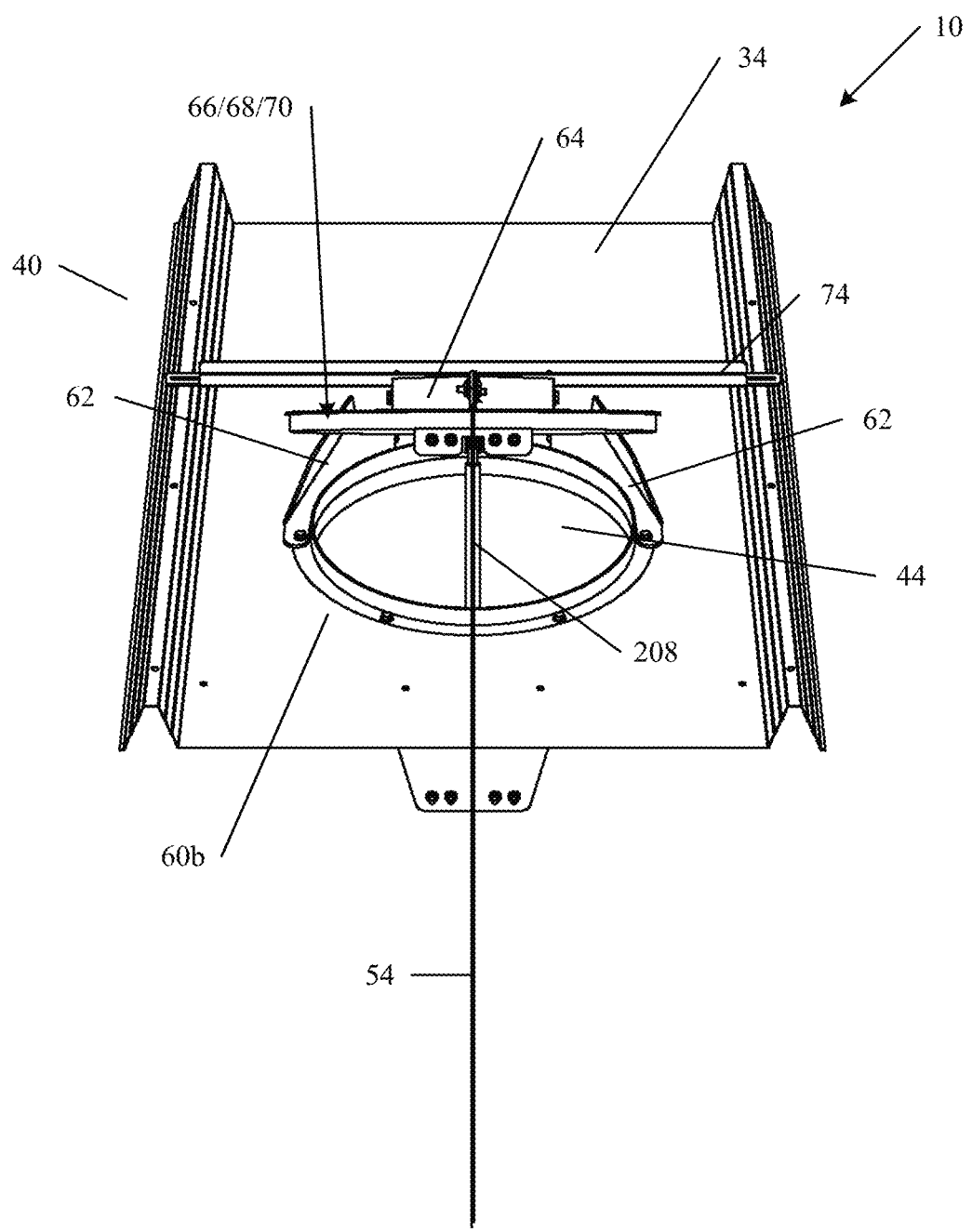
FIG. 4 is a front perspective view of a roof panel having a roof vent, in accordance with one or more embodiments; the view showing the roof vent with the lid in an open position.
Figure 5:
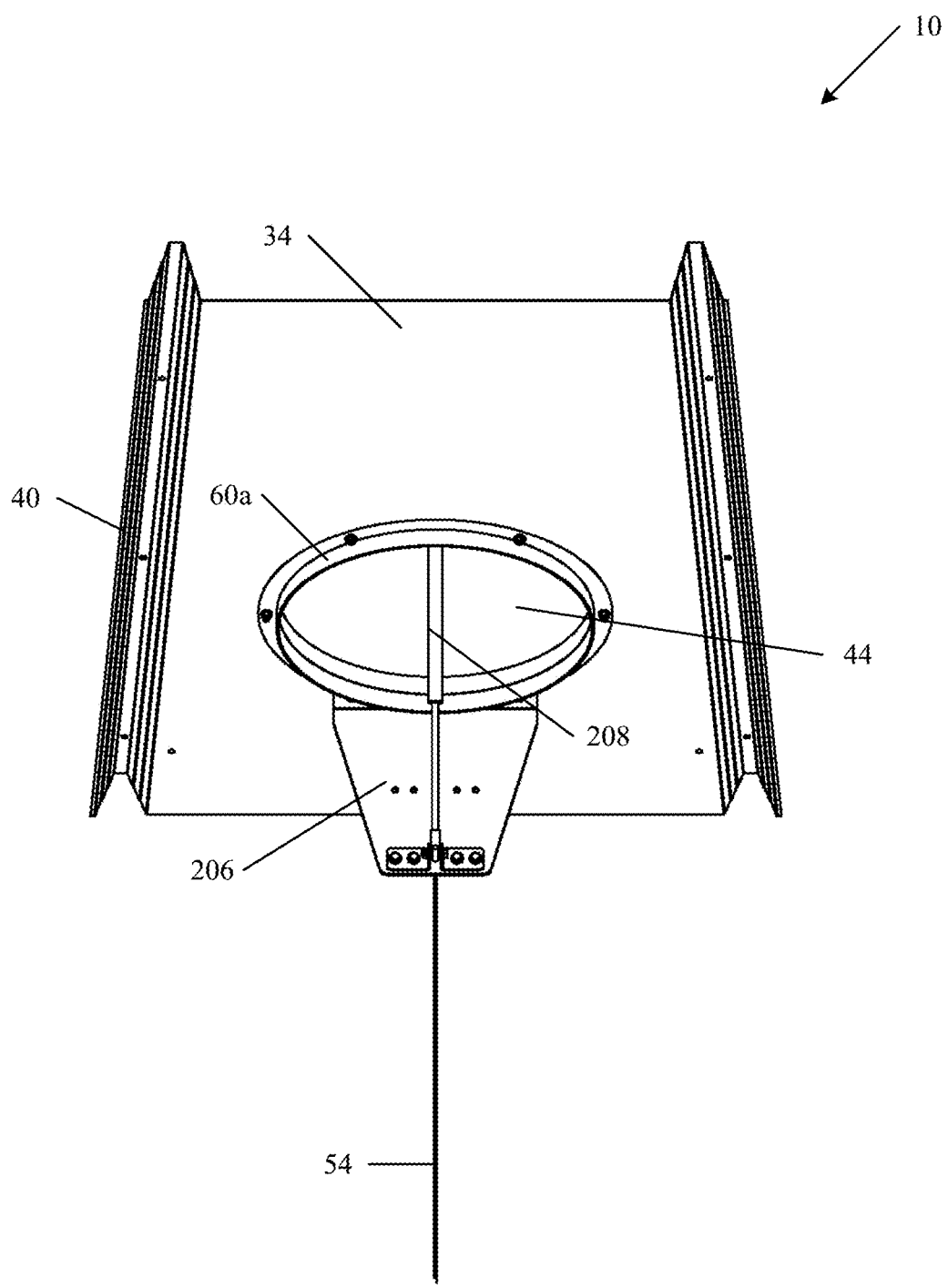
FIG. 5 is a rear perspective view of a roof panel having a roof vent, in accordance with one or more embodiments; the view showing the roof vent with the lid in an open position.
Figure 6:
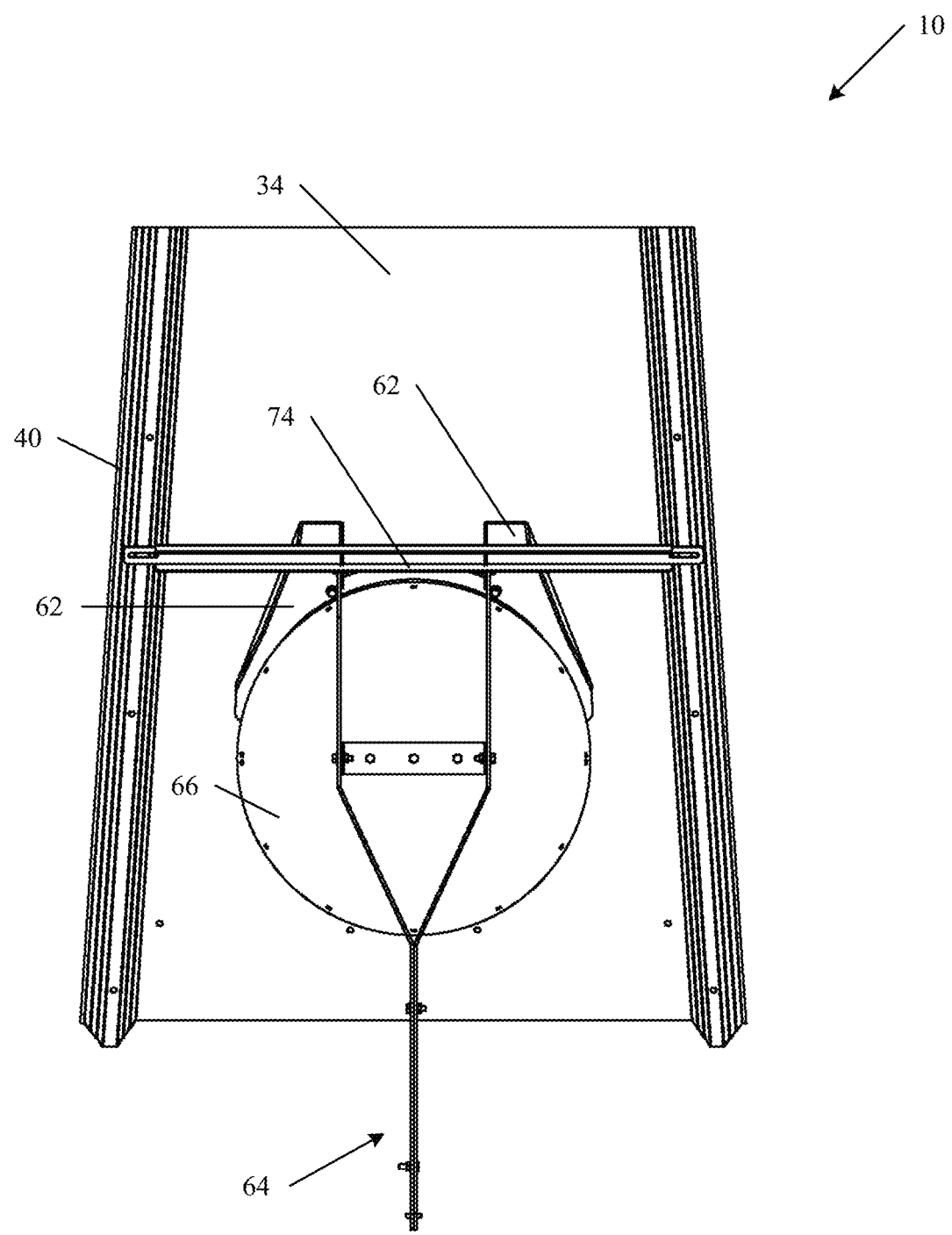
FIG. 6 is a top perspective view of a roof panel having a roof vent, in accordance with one or more embodiments; the view showing the roof vent with the lid in an open position.
Figure 7:
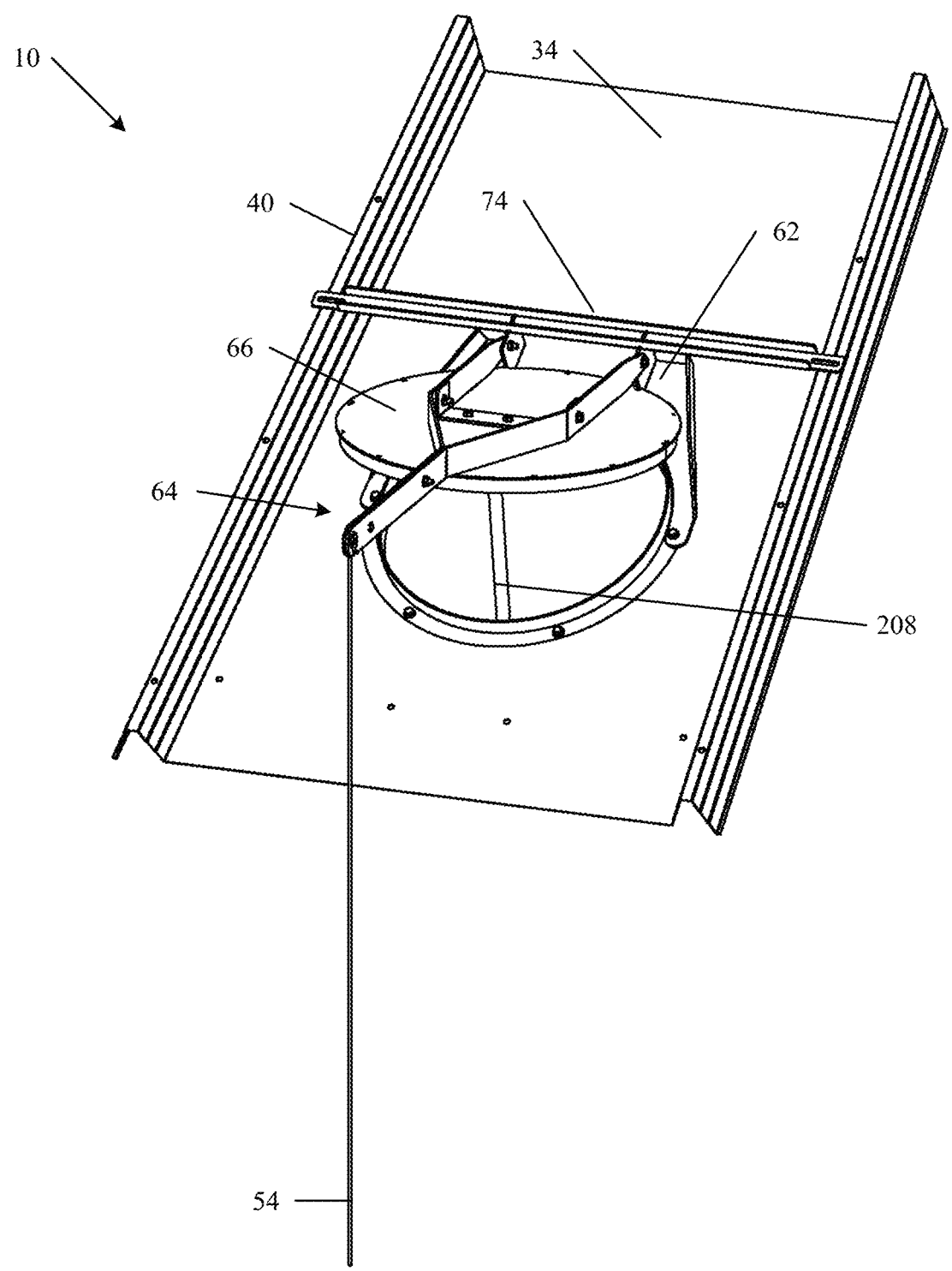
FIG. 7 is a front right perspective view of a roof panel having a roof vent, in accordance with one or more embodiments; the view showing the roof vent with the lid in an open position.
Figure 8:
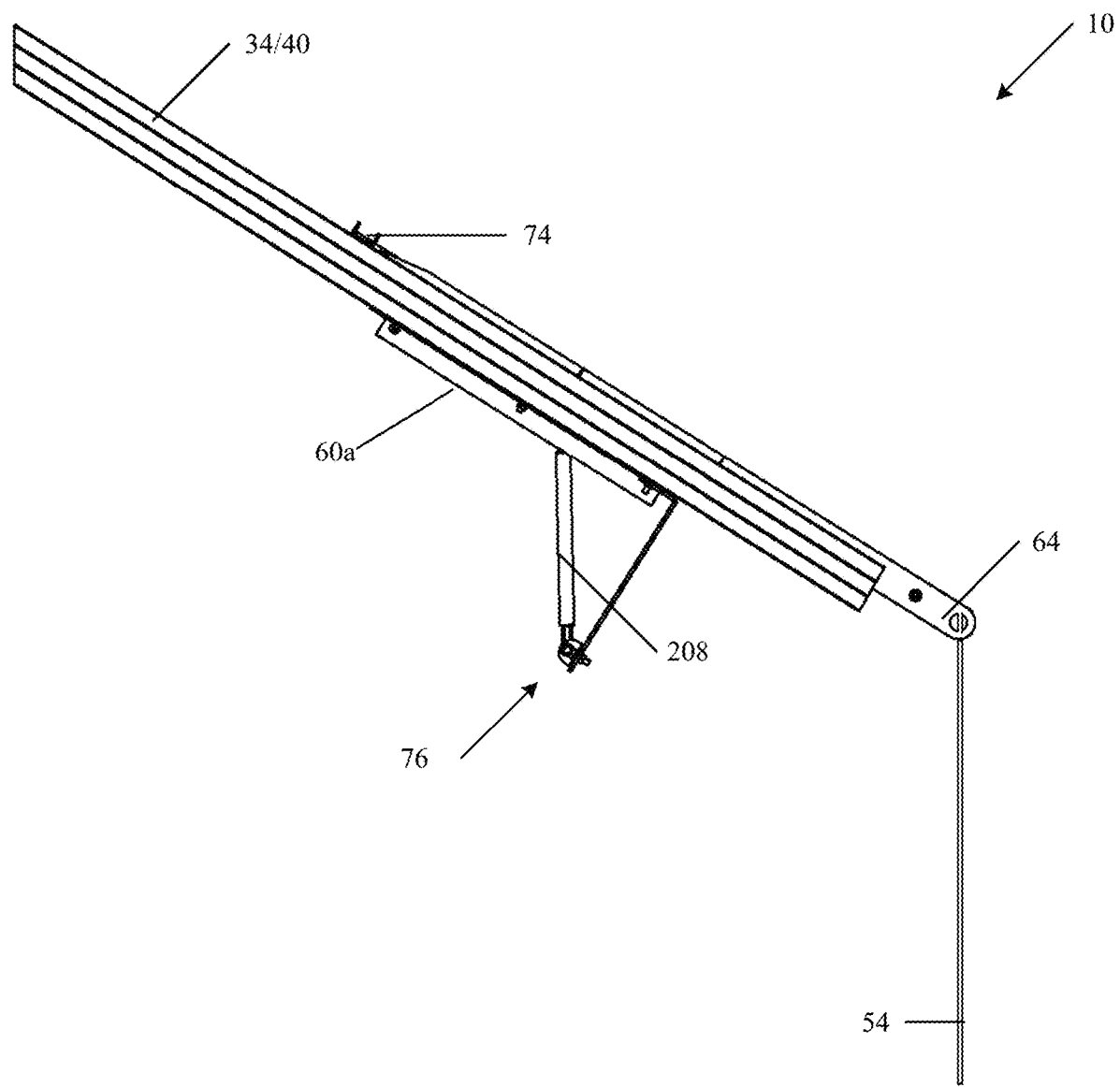
FIG. 8 is a left side view of a roof panel having a roof vent, in accordance with one or more embodiments; the view showing the roof vent with the lid in a closed position.
Figure 9:
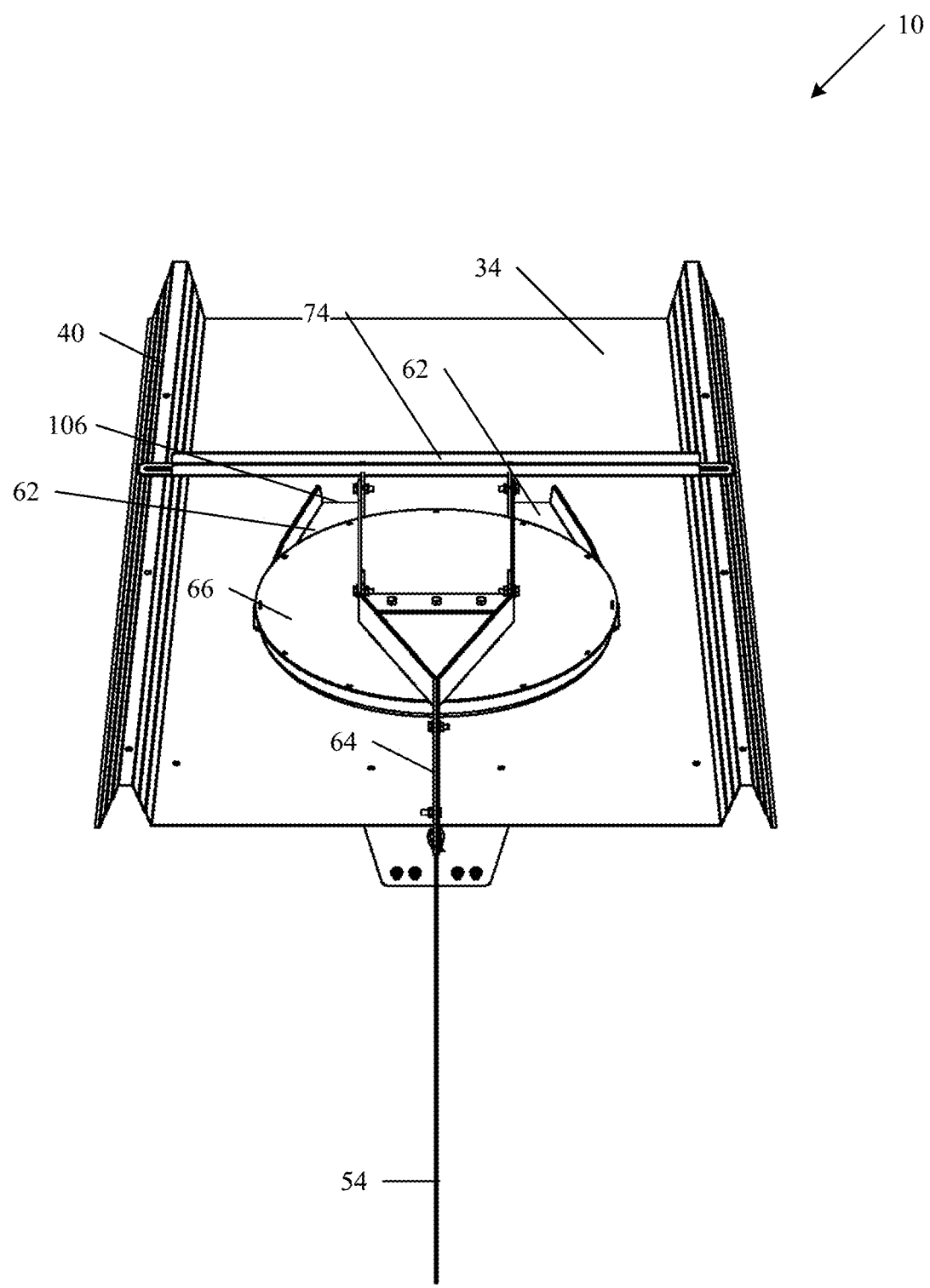
FIG. 9 is a front perspective view of a roof panel having a roof vent, in accordance with one or more embodiments; the view showing the roof vent with the lid in a closed position.
Figure 10:
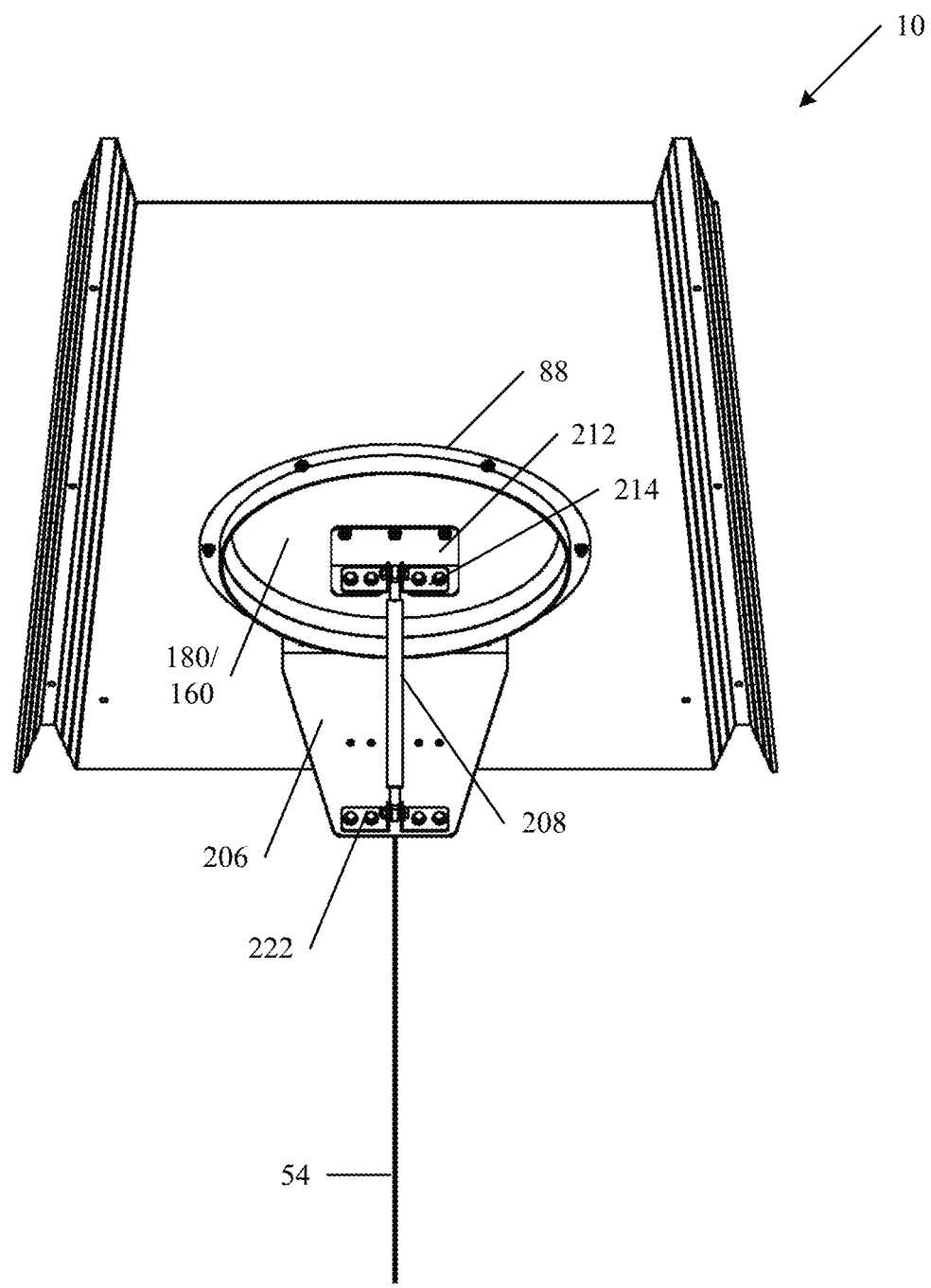
FIG. 10 is a rear perspective view of a roof panel having a roof vent, in accordance with one or more embodiments; the view showing the roof vent with the lid in a closed position.
Figure 11:
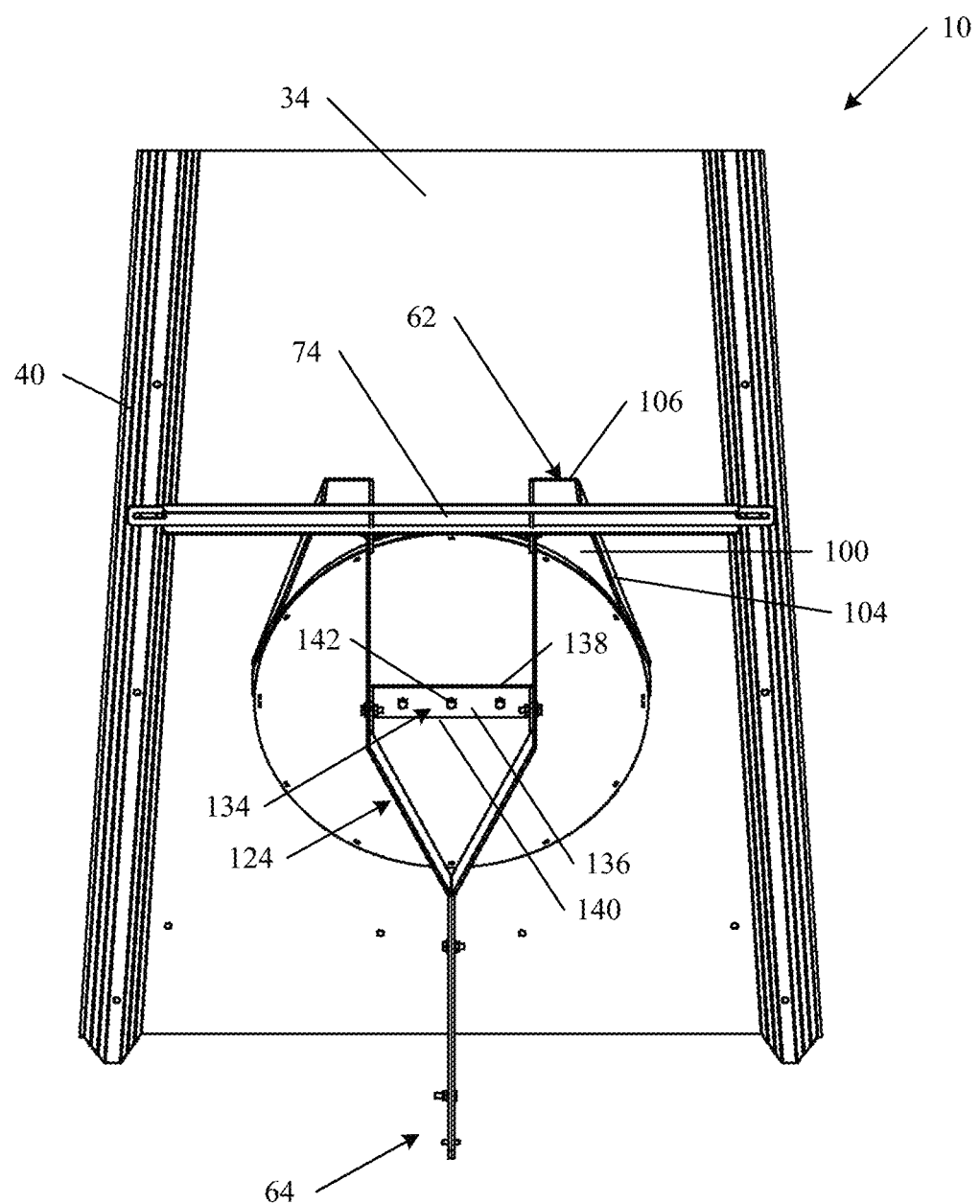
FIG. 11 is a top perspective view of a roof panel having a roof vent, in accordance with one or more embodiments; the view showing the roof vent with the lid in a closed position.
Figure 12:
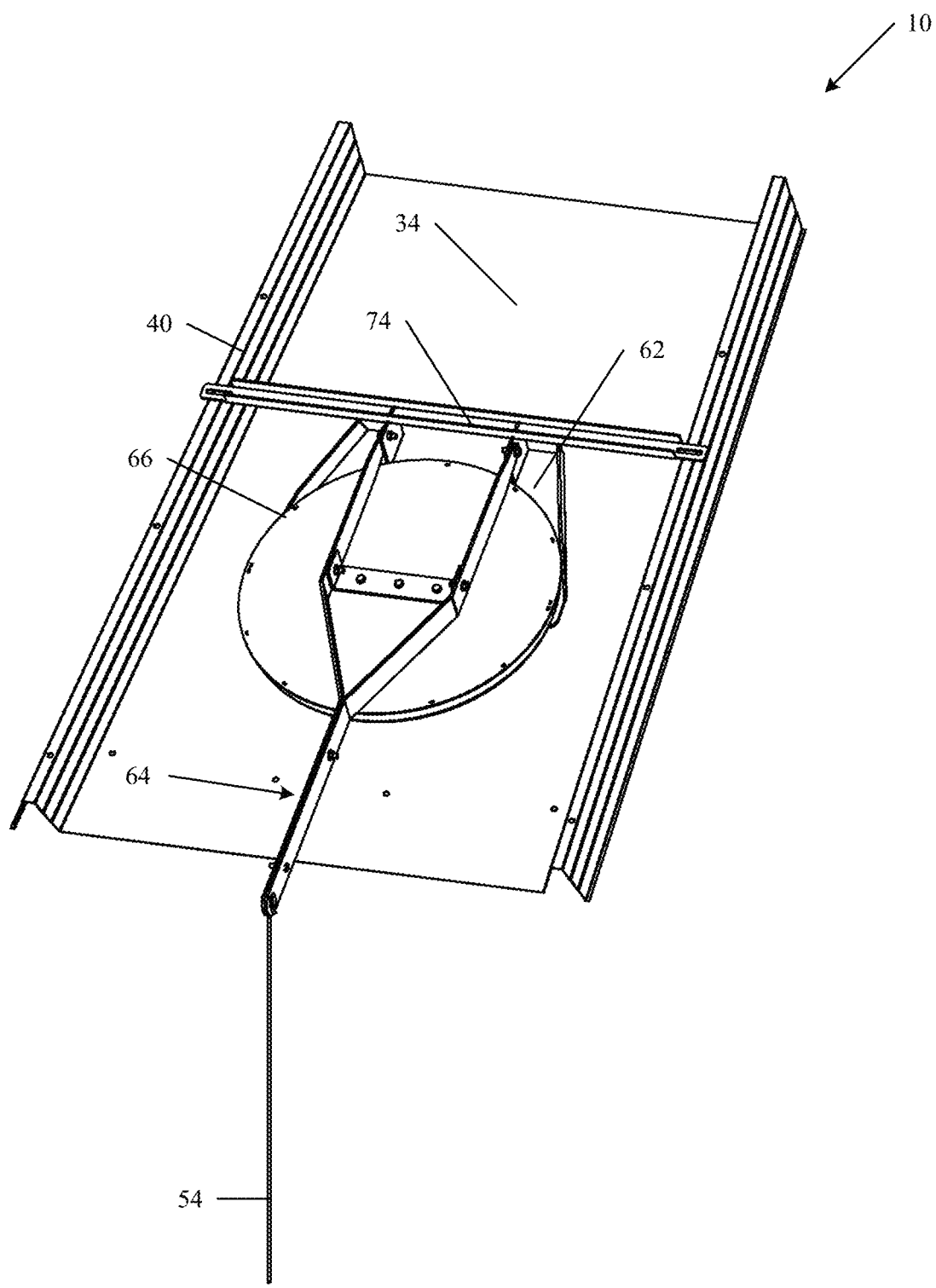
FIG. 12 is a front right perspective view of a roof panel having a roof vent, in accordance with one or more embodiments; the view showing the roof vent with the lid in a closed position.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

It should be understood that any advantages and/or improvements discussed herein may not be provided by various disclosed embodiments, and/or implementations thereof. The contemplated embodiments are not so limited and should not be interpreted as being restricted to embodiments that provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments that address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure. Moreover, although some disclosed embodiments may be described in the context of window treatments, the embodiments are not so limited. In is appreciated that the embodiments may be adapted for use in other applications which may be improved by the disclosed structures, arrangements and/or methods.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments and/or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of grain bins. However, the embodiments are not so limited. It is appreciated that the embodiments may be adapted for use in other applications which may be improved by the disclosed structures, arrangements and/or methods. The system is merely shown and described as being used in the context of grain bins for ease of description and as one of countless example applications.

Turning now to the figures, a self-opening roof vent system 10 (system 10) is presented for grain storage devices such as a grain bin 12, as is shown as one example.

Grain Bin 12

In the arrangement shown, as one example, self-opening roof vent system 10 is used in association with a grain bin 12. However, it is hereby contemplated that self-opening roof vent system 10 may be used with any grain storage device and use with grain bin 12 is only one of countless examples. As such, unless stated otherwise, reference to grain bin 12 is intended to imply any grain storage device.

Grain bin 12 may be formed of any suitable size, shape, and design and is configured to hold a bulk amount of flowable material such as grain or the like materials. In one or more arrangements, as is shown, grain bin 12 is a large, generally cylindrical structure that has a curved sidewall 14. Sidewall 14 connects at its lower end to a foundation 16. Sidewall 14 connects at its upper end to a peaked roof 18.

Sidewall 14 of grain bin 12 is formed of any suitable size, shape, and design. In one or more arrangements, as is shown, sidewall 14 is formed of a plurality of sheets 20 of material. Sheets 20 have an upper edge 22, a lower edge 24 and side edges 26. Sheets 20 have in exterior surface 28 and interior surface 30 (not show). In the arrangement shown, as one example, these sheets 20 are formed of corrugated material. That is, when sheets 20 are viewed from their side edge 26, the sheets 20 have a repetitive oscillating curve that smoothly transitions between rounded peaks and rounded valleys, similar to that of a sine-wave or sine-function. This corrugation provides strength and rigidity to the sheets of material that form sidewall 14. Any other configuration of sidewall 14 and more broadly grain bin 12 or even more broadly a grain storage device, is hereby contemplated for use in association with self-opening roof vent system 10.

Sheets 20 of sidewall 14 may be formed of a single layer of material. Alternatively, to increase the strength and rigidity of the sidewall 14 a plurality of sheets 20 may be laid over one another, thereby forming what is known as a "laminated" sheet 20 of sidewall 14. Laminated sheets 20 may include two, three, four, five, or any other number of layers.

In one or more arrangements, as is shown, sheets 20 curve slightly from side edge 26 to side edge 26 such that each sheet 20 forms a partial portion of a cylinder. In this example arrangement, a plurality of sheets 20 are connected together in side-to-side arrangement to form what is known as a ring 32. In one or more arrangements, as is shown, rings 32 are vertically stacked to form sidewall 14, which extends from foundation 16 at its lower end to peaked roof 18 at its upper end.

Roof 18

In the arrangement shown, as one example, grain bin 12 includes a roof 18. Roof 18 may be formed of any suitable size, shape, and design and is configured to cover and enclose the upper end of grain bin 12. In the arrangement shown, as one example, roof 18 is formed of a plurality of panels 34. In the arrangement shown, as one example, panels 34 extend a length from an upper end 36 to a lower end 38. In the arrangement shown, as one example, panels 34 extend a width between opposing ribs 40. Each panel 34 may be formed of a single piece of material or multiple pieces of material that are connected to one another In the arrangement shown, as one example, upper end 36 of panels 34 connect to or terminate at center ring 42. In the arrangement shown, as one example, center ring 42 is a generally circular shaped member that has a hollow interior that provides a passageway into the hollow interior of grain bin 12 that is used to fill grain bin 12 with grain. The assembly of center ring 48 also facilitates the connection of the upper end 36 of panels 34 to center ring 42, thereby securing the upper end 36 of panels 34. In the arrangement shown, as one example, center ring 42 is positioned at the approximate middle or center of grain bin 12. Any other configuration is hereby contemplated for center ring 42.

In the arrangement shown, as one example, upper end 36 of panels 34 is positioned above lower end 38 of panel 34 so as to facilitate water, dust, dirt and debris that collects on roof 18 to shed downward and outward away from grain bin 12. In the arrangement shown, as one example, lower end 38 of panels 34 extend past sidewall 14 a distance so as to facilitate water, dust and debris that is shed off of roof 18 clears sidewall 14, thereby keeping sidewall 14 clean and dry.

In the arrangement shown, as on example, upper end 36 of panels 34 are narrower than lower end 38 of panels 34. This arrangement allows a plurality of panels 34 to extend around the center point of roof 18 while extending downward and outward from the center point. In the arrangement shown, as one example, ribs 40 of one panel 34 nest with the ribs 40 of the adjacent panels 34 in an overlapping and nesting condition. In the arrangement shown, as one example, to facilitate this overlapping and nesting condition, ribs 40 are formed of trapezoidal shaped members, or more specifically isosceles trapezoid shaped members, when viewed from the upper end 36 or lower end 38 of panel 34. However, any other shape is hereby contemplated for use as ribs 40.

In the arrangement shown, as one example, panel 34 is generally flat and planar between upper end 36 and lower end 38 and between the interior edges of opposing ribs 40. In the arrangement shown, as one example, ribs 40 add strength and rigidity to panel 34 and roof 18. In addition, ribs 40 provide a convenient, strong, secure and easy-to-install/assemble manner of connecting adjacent panels 34. In the arrangement shown, as one example, when ribs 40 of adjacent panels 34 are nested with one another in overlapping condition, fasteners, such as screws or bolts can be passed through the overlapping ribs 40, thereby securing adjacent panels to one another. In addition, fasteners such as screws or bolts can be passed through portions of roof 18 and into other portions of grain bin 12, thereby securing roof 18 to grain bin 12.

Roof Vent System 10

The roof vent system 10 is formed of any suitable size, shape, and design and is configured to provide ventilation though one or more roof vents 50 when the vents are opened and provide an airtight seal and/or a completely airtight seal when the vents are closed. In an arrangement shown, as one example, the roof vent system 10 includes the following component pieces: a roof vent 50, a control lever 52, and a pull 54 among other components.

In one or more arrangements, roof vent 50 is installed on a roof of a structure (e.g., roof 18 of grain bin 12) and is connected to control lever 52 by pull 54. Control lever 52 may be installed, for example, on a wall of the structure (e.g., sidewall 14 of grain bin 12) or at any other operable location. In this example arrangement, roof vent 50 is configured to maintain a lid 66 in an open position unless a downward force is applied to the lid 66 by pull 54 (e.g., by actuation of control lever 52). In this example arrangement, when sufficient downward force is applied, the lid 66 is lowered to a closed position, where the opening in the panel 34 of roof 18 is covered by the lid 66 at which point roof vent 50 becomes sealed.

Roof Vent 50

Roof vent 50 is formed of any suitable size, shape, and design and is configured to permit flow of air through roof vent 50 when lid 66 is in the open position and inhibit the flow of air through roof vent 50 when lid 66 is in the closed position. In an arrangement shown, as one example, roof vent 50 includes the following component pieces: inner ring 60a and outer ring 60b, exterior hinge members 62, a lever 64, lid 66, a sealing member 68, a support member 70, fasteners 72, a stabilizer 74, and an interior mount assembly 76 among other components.

Rings 60

Rings 60 are formed of any suitable size, shape, and design and are configured to facilitate attachment of roof vent 50 to panel 34 at opening 44. In an arrangement shown, as one example, rings 60 each have a generally circular shape having a hollow interior 86 and extending from an upper edge 82 to a lower edge 84. In this example arrangement, inner ring 60a has a flange 88 extending outward from upper edge 82. In this example arrangement, outer ring 60b has a flange 88 extending outward from lower edge 84.

In the arrangement shown, outer ring 60b is attached to roof panel 34 at opening 44 with flange 88 contacting an exterior surface of roof panel 34 at the edge of opening 44. In this example arrangement, inner ring 60a is attached to roof panel 34 at opening 44 with flange 88 contacting an interior surface of roof panel 34 at the edge of opening 44.

Fasteners 72

In this example arrangement, rings 60 are attached to roof panel 34 by a set of fasteners 72. Fasteners 72 may be formed of any suitable size, shape, and design and are configured to facilitate attachment of two components. For example, fasteners may include but not be limited to welding, rivets, pins, clamps, bolts, screws, adhesives, chemical bonding, and/or any other process or means that results in a permanent or semi-permanent connection. In the arrangement shown, as one example, rings 60 are attached to panel 34 using bolts that extend through flanges 88 of rings 60a and 60b and through panel 34, thereby compressing panel 34 between inner ring 60a and outer ring 60b using a single set of fasteners 72.

Exterior Hinge Members 62

In the arrangement shown, as one example, exterior hinge members 62 are attached to or near the outer ring 60b at a top end of opening 44. Exterior hinge members 62 are formed of any suitable size, shape, and design and are configured to facilitate hinged attachment of lever 64 at a top end of opening 44 of roof vent 50 to panel 34 of roof 18. In an arrangement shown, as one example, exterior hinge members 62 are attached to an upper end of outer ring 60b on opposing sides of opening 44. In this example arrangement, each exterior hinge member 62 has a base 100, a fulcrum member 102, and a flange 104.

Base 100 is formed of any suitable size, shape, and design and is configured to facilitate attachment of exterior hinge member 62 at or to outer ring 60b and/or panel 34 of roof 18. In this example arrangement, each base 100 extends in a plane from an upper end 106 to a lower end 108 between an inner edge 110 and an outer edge 112. In this example arrangement, a portion of inner edge 110 has a curved shape configured to match up to an outer surface of the outer ring 60. In this example arrangement, each base 100 is attached to outer ring 60b with inner edge 110 positioned against the exterior surface of ring 60 and a bottom surface of base 100 contacting an upper surface of flange 88 of outer ring 60. In this example arrangement, the flat and flush and overlapping nature of base 100 of exterior hinge member 62 with flange 88 of outer ring 60b with panel 34 of roof 18 with flange 88 of inner ring 60a provides increased strength and rigidity.

Another benefit of stacking these components is that a single fastener 72 can pass through all of these components, exterior hinge member 62, flange 88 of outer ring 60b, panel 34 of roof 18, and flange 88 of inner ring 60a, thereby speeding and easing assembly.

In the arrangement shown, as one example, a fastener 72 extends through base 100 adjacent the lower end of the curved surface formed by inner edge 110. In the arrangement shown, as one example, a fastener 72 extends through base 100 adjacent the upper end of the curved surface formed by inner edge 110. In this way, the lower end 108 and upper end 106 of exterior hinge member 62, adjacent the curved surface of inner edge 110 is secured to outer ring 60b, panel 34 of roof 18, and inner ring 60a. However, any other configuration is hereby contemplated for use.

Fulcrum member 102 is formed of any suitable size, shape, and design and is configured to facilitate attachment with lever 64 at a pivot point. In the example shown, fulcrum member 102 extends outward from base 100 in a direction tangent or perpendicular to the plane of base 100 and includes a hole 114, positioned at or near its upper end 106, at the pivot point to facilitate connection with lever 64.

Flange 104 is formed of any suitable size, shape, and design and is configured to prevent bending of base 100. In the example shown, flange 104 extends upward from outer edge 112 of base 100. In the arrangement shown, as one example, the plane formed by base 100 extends in approximate perpendicular alignment to the plane formed by flange 104. Similarly, in the arrangement shown, as one example, the plane formed by base 100 extends in approximate perpendicular alignment to the plane formed by flange fulcrum 102. In one or more embodiments, exterior hinge members 62 may include various other support structures in addition to or in lieu of flange 104.

Lever 64

Lever 64 is formed of any suitable size, shape, and design and is configured to facilitate hinged attachment to the pivot point of exterior hinge members 62 and attachment to lid 66. In the arrangement shown, as one example, lever 64 extends from an upper end 120, where lever 64 is configured to operably connect to exterior hinge members 62 at a pivot point, to a lower end 122, where lever 64 is configured to operably connect to pull 54, at a pivot point. In this example arrangement, the lower end of lever 64 extends outward beyond the lower end 38 of panels 34 of roof 18 to facilitate unobstructed movement of pull 54. This clearance prevents pull 54 from engaging and damaging itself or the edge of panel 34 of roof 18.

In this example arrangement, lever 64 includes a pair of opposing arms 124. In this example arrangement, each arm 124 includes an upper section 126, an angled section 128, and a lower section 130. In the arrangement shown, as one example, upper sections 126 are formed of generally flat and straight members that extend in generally flat and straight manner, however any other configuration is hereby contemplated for use. In the arrangement shown, as one example, upper sections 126 of arms 124 are spaced apart and extend in approximate parallel spaced relation to one another from their upper rearward end to their lower forward end that connects to angled section 128. In the arrangement shown, as one example, upper sections 126 of arms 124 are positioned for connecting with fulcrum members 102 of exterior hinge members 62. In this example arrangement, upper sections 126 each have a hole 132 near upper end 120. In this example arrangement, each arm 124 of lever 64 is connected to an exterior hinge member 62 by a fastener 72 that extends through hole 114 of fulcrum member 102 and hole 132 of upper section 126.

In the arrangement shown, as one example, angled sections 128 are formed of generally flat and straight members that extend in generally flat and straight manner, however any other configuration is hereby contemplated for use. In the arrangement shown, as one example, the angled sections 128 of opposing arms 124 angle toward one another as arms 124 extend downward from the lower end of upper sections 126 until they meet at the upper end of lower sections 130.

In the arrangement shown, as one example, lower sections 130 are formed of generally flat and straight members that extend in generally flat and straight manner, however any other configuration is hereby contemplated for use. In the arrangement shown, as one example, the lower sections 130 of opposing arms 124 extend in approximate parallel spaced relation to one another and connect to one another along the length of lower sections 130 as they extend downward from the lower end of angled sections 128 until they terminate at the lower end 122 of lever of lever 64. In this example arrangement, the lower sections 130 of arms 124 are connected together (e.g., by one or more fasteners 72) that extend through the adjacent lower sections 130.

Cross Bracket 134

In the arrangement shown, as one example, lever 64 includes a cross bracket 134. Cross bracket 134 is formed of any suitable size, shape, and design and is configured to facilitate attachment to the arm members 124 and attachment to lid 66. In the arrangement shown, as one example, cross bracket 134 has an elongated shape extending a length between opposing ends 136 and from an upper edge 138 to a lower edge 140. In this example arrangement, cross bracket 134 is attached to lid 66 at a number of points along the length between opposing ends 136 and is attached to arms 124 at the opposing ends 136. In this example arrangement, cross bracket 134 is bent approximately 90 degrees at each end 136 to facilitate attachment with arms 124. In the arrangement shown, as one example, cross bracket 134 includes holes 142 to facilitate attachment with lid 66 and arms 124 by fasteners 72.

In the arrangement shown, as one example, cross bracket 134 is positioned between opposing arms 124 of lever 64 a distance below upper end 120 and a distance above angled section 128. However, any other configuration is hereby contemplated for use, as is the use of multiple cross brackets 134.

Lid 66

Lid 66 is formed of any suitable size, shape, and design and is configured to cover and facilitate sealing of opening 44 when roof vent 50 is closed. In the arrangement shown, as one example, lid 66 has a generally planar shape having an upper surface 148 and a lower surface 150 and extending outward from a center to a peripheral edge 152.

In this example arrangement, lid 66 also includes a lip 154 extending downward from lower surface 150 adjacent the peripheral edge 152. Lip 154 is formed of any suitable size, shape, and design and is configured to fit over outer ring 60b and facilitate covering and sealing of opening 44 when roof vent 50 is closed. In the arrangement shown, as one example, lip 154 has a generally circular shape having a hollow interior 86 and extending from a lower edge 84 to an upper edge 82 where lip 154 is attached to lower surface 150 of lid 66. In this example arrangement, lip 154 is sized so outer ring 60*b* fits inside of the hollow interior formed by lip 154. In the arrangement shown, as one example, lip 154 extends downward from the plane formed by the lower surface 150 of lid 66 in a generally perpendicular manner.

Sealing Member 68

In the arrangement shown, as one example, a sealing member 68 is attached to lower surface 150 of lid 66 within the hollow interior formed by lip 154. Sealing member 68 is formed of any suitable size, shape, and design and is configured to provide an airtight seal and/or a completely airtight seal with the upper edge of outer ring 60*b* when the lid 66 is in the closed position. In the arrangement shown, as one example, sealing member 68 has a generally planar shape having an upper surface 166 and a lower surface 168 extending between a generally circular interior edge 170 and a generally circular exterior edge 172. In this example arrangement, exterior edge 172 extends to lip 154 of lid 66 and terminates at or just inward of the interior surface of lip 154.

In one or more arrangements, sealing member 68 may be formed of any compressible food safe material that is capable of forming an airtight and/or completely airtight seal between lid 66 and outer ring 60*b* such as rubber, foam, plastic, composite, nylon, neoprene, a poly, or any other compressible material and/or combination thereof. In this example arrangement, when lid 66 is in the closed position, lid 66 presses sealing member 68 against the upper edge of outer ring 60*b*. As sealing member 68 is pressed against the upper edge of outer ring 60*b*, sealing member 68 is compressed and deforms around outer ring 60*b* to provide an airtight and/or completely airtight seal. That is, as the lid 66 is closed, the portion of sealing member 68 captured between or pinched between the lower surface 150 of lid 66 and the upper edge of outer ring 60*b* is compressed and forms an airtight and/or completely airtight seal between lid 66 on the upper side and outer ring 60*b* on the lower side.

In one or more arrangements, sealing member 68 is attached to lower surface 150 of lid 66 using rivets, pins, clamps, bolts, screws, adhesives, chemical bonding, a friction-fit within the interior surface of lip 154 and the lower surface 150 of lid 66, and/or any other process or means that results in a permanent or semi-permanent connection. In the arrangement shown, as one example, sealing member 68 is attached to lower surface 150 of lid 66 by support member 70.

Support Member 70

Support member 70 is formed of any suitable size, shape, and design and is configured to press and hold sealing member 68 against lower surface 150 of lid 66. In the arrangement shown, as one example, support member 70 has a generally planar shape having an upper surface 178 and a lower surface 180 and extending outward from a center to a peripheral edge 182. In this example arrangement, peripheral edge 182 has a generally circular shape with a diameter smaller than an interior diameter of outer ring 60*b*. In this example arrangement, peripheral edge 182 has a generally circular shape with a diameter smaller than an interior diameter of lip 154. In this example arrangement, the diameter of peripheral edge 182 is larger than a diameter of interior edge 170 of sealing member 68 so support member 70 overlaps an inner portion of sealing member 68.

In this example arrangement, support member 70 is attached to lid 66 by fasteners 72. When attached to lid 66 by fasteners 72, sealing member 68 is compressed between lower surface 150 of lid 66 on its upper surface 166 and upper surface 178 of support member 70 on its lower surface 168, thereby holding sealing member 68 in place on lid 66.

Stabilizer 74

It is recognized that application of downward force on lever 64 may generate lifting force at an upper end of roof vent 50. To prevent the lifting force from deforming roof panel 34, which can cause air to leak or prevent forming a seal, in one or more embodiments roof vent 50 includes a stabilizer 74. Stabilizer 74 is formed of any suitable size, shape, and design and is configured to prevent deformation of roof panel 34, and is configured to secure, strengthen and reinforce roof vent 50.

In the arrangement shown, as one example, stabilizer 74 has a bottom 188 having an elongated shape extending a length between opposing ends 190 and between an upper edge 192, and a lower edge 194. In this example arrangement, stabilizer 74 has flanges 196 extending upward from upper edge 192 and lower edge 194. In the arrangement shown, as one example, the center portion of stabilizer 74, between flanges 196 is generally flat and straight, and flanges 196 are similarly generally flat and straight. In the arrangement shown, as one example, opposing flanges 196 extend in a generally parallel spaced manner to one another. In the arrangement shown, as one example, opposing flanges 196 extend in a generally perpendicular manner to the plane formed by the center portion of stabilizer 74 between opposing flanges 196. This U-shaped or C-shaped configuration provides additional strength and rigidity and helps to resist deformation and bending.

In this example arrangement, bottom 188 include a pair of slots 198 positioned at outward ends 190 of stabilizer 74 that are configured to receive and/or engage upper edges of exterior hinge members 62. In the arrangement shown, as one example, ends 190 are attached to ribs 40 on each side of panel 34 by fasteners 72 that extend through slots 198. With ends 190 attached to ribs 40, bottom 188 of stabilizer 74 contacts and holds down exterior hinge members 62 to oppose lifting forces at an upper end of roof vent 50 and thereby prevent deformation of panel 34 and increasing the ability to generate an airtight and/or completely airtight seal by allowing greater down-pressure without deformation.

Interior Mount Assembly 76

Interior mount assembly 76 is formed of any suitable size, shape, and design and is configured to provide a biasing upward force to lid 66 sufficient to move lid 66 to the open position in the absence of an opposing downward force on lid 66. In the arrangement shown, as one example, interior mount assembly 76 includes an upper mount 204 attached to lower surface 180 of support member 70, a lower mount 206, and a bias member 208 attached to inner ring 60*a* and connected to upper mount 204 and lower mount 206.

Upper mount 204 is formed of any suitable size, shape, and design and is configured to facilitate connection of bias member 208 to support member 70 and/or lid 66. In the arrangement shown, as one example, upper mount 204 has a bracket 212 connected to support member 70 by fasteners 72 and a pivot connector 214 connected to bracket 212. In the arrangement shown, as one example, bracket 212 is formed of a generally L-shaped member, where the upper portion of the bracket 212 is connected to lid 66 and/or support member 70 and the upper end of bias member 208 connects to the downwardly extending flange of bracket 212. In the arrangement shown, as one example, a pivot connector 214 is positioned on each side of the upper end of bias member 208 and connects bias member 208 to bracket 212. In the arrangement shown, as one example, pivot connectors 214 are formed of a generally L-shaped member, where one portion connects to the downwardly extending flange of bracket 212 and the other portion connects to the upper end of bias member 208. Once connected, pivot connectors 214 allow the upper end of bias member 208 to pivot, slightly, as the lid 66 opens and closes and the relative angle of bias member 208 changes slightly as the length of bias member 208 changes. However, any other configuration is hereby contemplated for use.

Lower mount 206 is formed of any suitable size, shape, and design and is configured to facilitate connection of bias member 208 to flange 88 of inner ring 60a. In the arrangement shown, as one example, lower mount 206 has an upper end 220 that connects to flange 88 of inner ring 60a. In the arrangement shown, as one example, the forward edge of lower mount 206 has a curved surface that fits around the curved surface of the lip of inner ring 60a and includes a hole in each outward end of upper end 220 to facilitate secure attachment to flange 88 of inner ring 60a using fasteners 72. Lower mount 206 extends downward from upper end 220 to a lower end 218. In the arrangement shown, as one example, lower mount 206 is formed of a generally L-shaped member where the upper end 220 is connected to inner ring 60a and the lower end 218 is a free end that terminates in the space within grain bin 12 a distance below upper end 220. In the arrangement shown, as one example, the upper end 220 and lower end 218 of lower mount 206 extend in approximate perpendicular alignment to one another.

In the arrangement shown, as one example, the lower end 218 of lower mount 206 receives the lower end of bias member 208. In the arrangement shown, as one example, a pivot connector 222 is positioned on each side of the lower end of bias member 208 and connects bias member 208 to lower end 218 of lower mount 206. In the arrangement shown, as one example, pivot connectors 222 are formed of a generally L-shaped member where one portion connects to the downwardly extending portion of lower mount 206 adjacent lower end 218 and the other portion connects to the lower end of bias member 208. Once connected, pivot connectors 222 allow the lower end of bias member 208 to pivot, slightly, as the lid 66 opens and closes and the relative angle of bias member 208 changes slightly as the length of bias member 208 changes. However, any other configuration is hereby contemplated for use.

Bias Member 208

Bias member 208 is formed of any suitable size, shape, and design and is configured to attach to and between lower mount 206 and upper mount 204 and provide a bias force between lower mount 206 and upper mount 204 sufficient to move lid 66 to an open position in the absence of an opposing downward force on lid 66. In the arrangement shown, as one example, bias member 208 is a telescoping unit having an upper end 226 and a lower end 228 that have holes there through that serve as a pivot point during opening and closing as the length of bias member 208 changes. In this example arrangement, the bias member 208 is extendable and is configured to move upper end 226 and lower end 228 outward from each other. In various arrangements, bias member 208 may utilize various mechanisms to extend upper end 226 and lower end 228 outward from each other including but not limited to, for example one or more springs, one or more gas pistons, one or more gas springs, one or more hydraulic pistons, one or more actuators, one or more solenoids, one or more pneumatic members, and/or any other force generating means or combination thereof.

In the arrangement shown, as one example, upper end 226 of bias member 208 is connected to pivot connector 214 of upper mount 204 and lower end 228 of bias member 208 is connected to pivot connector 222 of lower mount 206. In this example arrangement, bias member 208 is configured to extend upper end 226 upward away from lower end 228 to apply an upward force to upper mount 204, support member 70, sealing member 68, and lid 66 to cause roof vent 50 to open unless a greater downward force is applied to lever 64.

In the arrangement shown, as one example, a gas spring piston is shown, which has been tested with success. In the arrangement shown, as one example, bias member 208 includes a rod at its lower end that fits within a sheath at its upper end in overlapping condition, thereby allowing the extension and compression of the bias member 208. In one or more arrangements, the length and/or pressure or strength of bias member 208 is adjustable. This may be accomplished by rotating one portion of the bias member 208 (such as the lower end or upper end) relative to another portion of the bias member 208 (such as the lower end or upper end).

Pull 54

Pull 54 is formed of any suitable size, shape, and design and is configured to facilitate connection of lower end 122 of lever 64 to control lever 52. In some various arrangements, pull 54 may be formed by a flexible connector such as cable, chain, rope, cord, wire, strap and/or any other flexible connector, by a rigid connector such as a rod, a pole, or/and other elongated ridged member, or any combination thereof. In the arrangement shown, as one example, pull 54 is a cable having one end attached to lower end 122 of lever 64 and the other end attached to control lever 52.

Control Lever 52

Control lever 52 is formed of any suitable size, shape, and design and is configured to facilitate movement of pull 54 between an upper position (which corresponds to an open position of roof vent 50) and a lower position (which corresponds to a closed position of roof vent 50). In this example arrangement, control lever 52 includes a standoff bracket 232, a pivot connector 234, and a lever 236.

Standoff bracket 232 is formed of any suitable size, shape, and design and is configured to facilitate attachment of pivot connector 234 to sidewall 14 of grain bin 12. In the arrangement shown, as one example, standoff bracket 232 extends from a rearward end 238 to a forward end 240 and includes a flange 242 extending outward to the side from the rearward end 238 so as to facilitate connection to sidewall 14 of grain bin 12. In this example arrangement, flange 242 includes holes 244 to facilitate attachment of standoff bracket 232 to the sidewall 14 of grain bin 12.

Pivot connector 234 is formed of any suitable size, shape, and design and is configured to provide a pivot connection for lever 236 to facilitate movement of lever 236 between an upper position (or open position) and a lower position (or closed position). In the arrangement shown, as one example, pivot connector 242 has a back 246 connected to forward end 240 of standoff bracket 232. In this example arrangement, back 246 extends between opposing edges 252 from an upper end 248 to a lower end 250. In this example arrangement, pivot connector 242 has sides 254 extending forward from edges 252. In the arrangement shown, as one example, sides 254 have pivot holes 256 for connecting with lever 236 so as to facilitate lever 236 to pivot thereon.

Lever 236 is formed of any suitable size, shape, and design and is configured to connect with pivot connector 234, connect with pull 54, and move pull 54 between an upper position (or open position) and a lower position (or closed position). In the arrangement shown, as one example, lever 236 includes a pair of arms 262 extending from a pivot end 264 to a handle end 266. In this example arrangement, arms 262 are connected by cross members 268 that extend between arms 262 that extend in parallel spaced relation to one another. In this example arrangement, lever 236 includes a hole 270 at pivot end 264 to facilitate a pivoting connection with pivot hole 256 of pivot connector 234.

In this example arrangement, lever 236 includes a pull connector 272 positioned near handle end 266 of lever 236 to facilitate connection with pull 54. In the arrangement shown, as one example, pull connector 272 is formed by a set of holes through which pull 54 is looped through and also includes a collar or sheath positioned between arms 262. However, embodiments are not so limited. Rather, pull connector 272 may connect pull 54 to lever 236 by rivets, pins, clamps, bolts, screws, adhesives, chemical bonding, welding, crimping, pinching, and/or any other connection means. In one or more arrangements, pull connector 272, pull 54, and/or lever 64 may include a length adjustment mechanism 274 to adjust add or shorten length of the pull 54 for optimal performance. The length adjustment mechanism 274 may be useful, for example, to adjust tension of the pull 54 after lever 236 is moved to the lower position to ensure an airtight and/or completely airtight seal of the roof vent 50 with the appropriate level of pressure.

In the arrangement shown, as one example, control lever 52 is configured to lock lever 236 in the upper position and/or lower position by inserting a lock pin 260 in lock pin holes 258 in arms 262. In the arrangement shown, as one example, a pair of lock pin holes 258 are presented, one at the upper end of pivot connector 234 that is used for locking lever 236 in a raised or open position, and one at the lower end of pivot connector 234 that is used for locking lever 236 in a lowered or closed position. However, embodiments are not so limited. In various embodiments, control lever 52 may additionally or alternatively use other lock mechanisms to lock control lever 52 in the upper position and/or lower positions including but not limited to, for example, snaps, latches, clips, hooks, catches, and/or any other fastener.

As one particular example, in some embodiments, control lever 52 is configured as an over-center lever. In an over-center lever, the lever can be moved to a position beyond the bottom most position at which point the upward force of pull holds the lever in place. Or said another way, when the lever is in an over-center condition it will remain in that position until the lever is intentionally moved out of the over-center condition. This is desirable if it is desired to keep roof vent 50 in a lowered and closed position.

In the arrangement shown, as one example, control lever 52 includes lock pin holes 258 to lock lever 236 in two positions (the upper position and the lower position). However, embodiments are not so limited. Rather, control lever 52 may include any number of lock pin holes 258 to lock lever 236 in any number of intermediate positions between the upper and lower positions.

In Operation

In one or more arrangements, roof vent system 10 is assembled when assembling roof 18 of grain bin 12. One or more panels 34 of roof 18 include opening 44 for placement and assembly of roof vent 50. Much assembly of roof vent 50 may be performed on the ground before the panel 34 is attached to roof 18. However, in some installations, it may be easier to install panel 34 on roof before adding the weight of roof vent 50.

Figure 13:
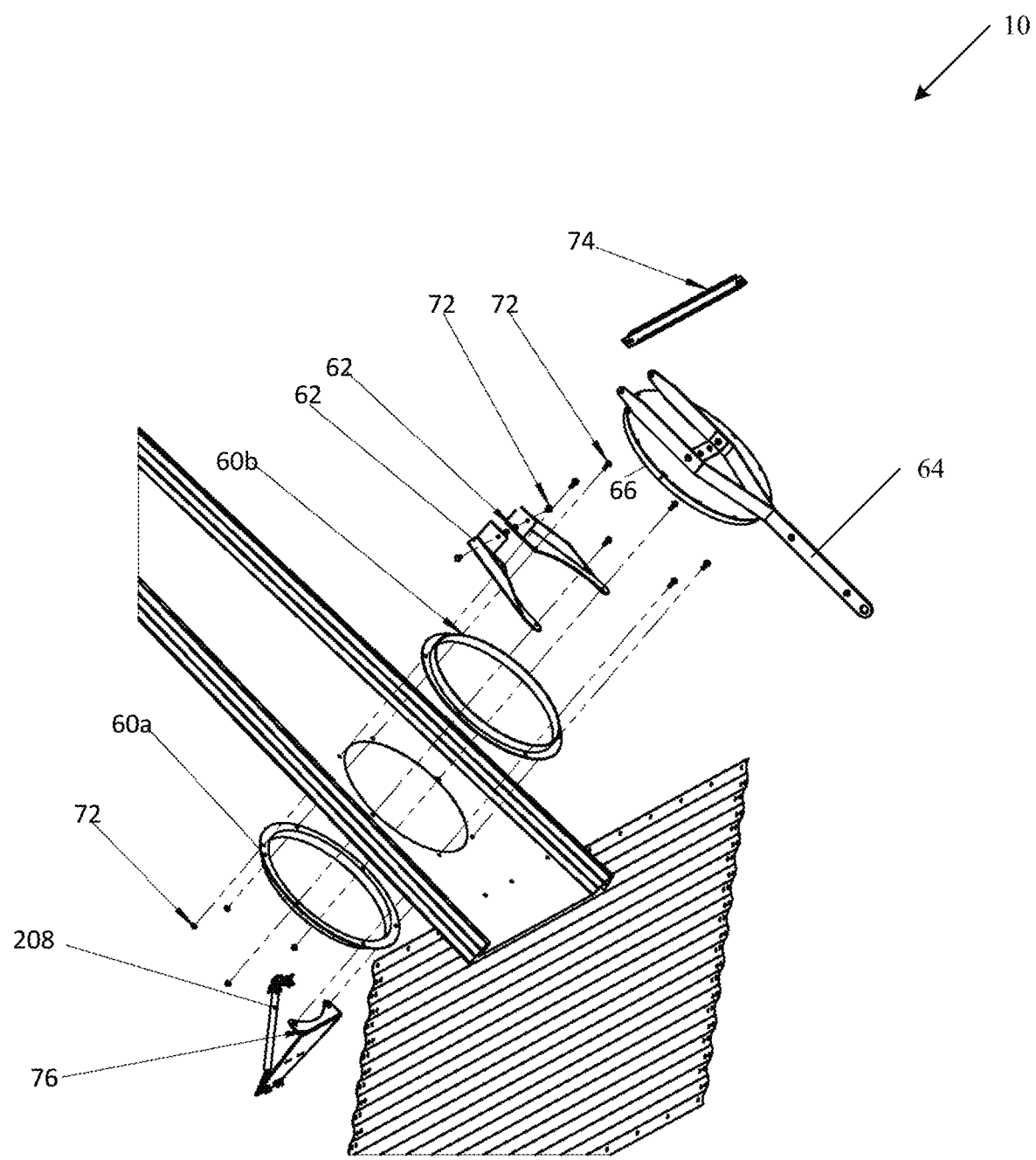
FIG. 13 is an exploded perspective view of a sidewall sheet, a roof panel, and a roof vent, in accordance with one or more embodiments; the view showing the roof panel having an opening for the vent; the view showing the vent having rings, a hinge, a lid, a lever, a stabilizer, an interior mount assembly having a bias member, and fasteners among other components.
Figure 14:
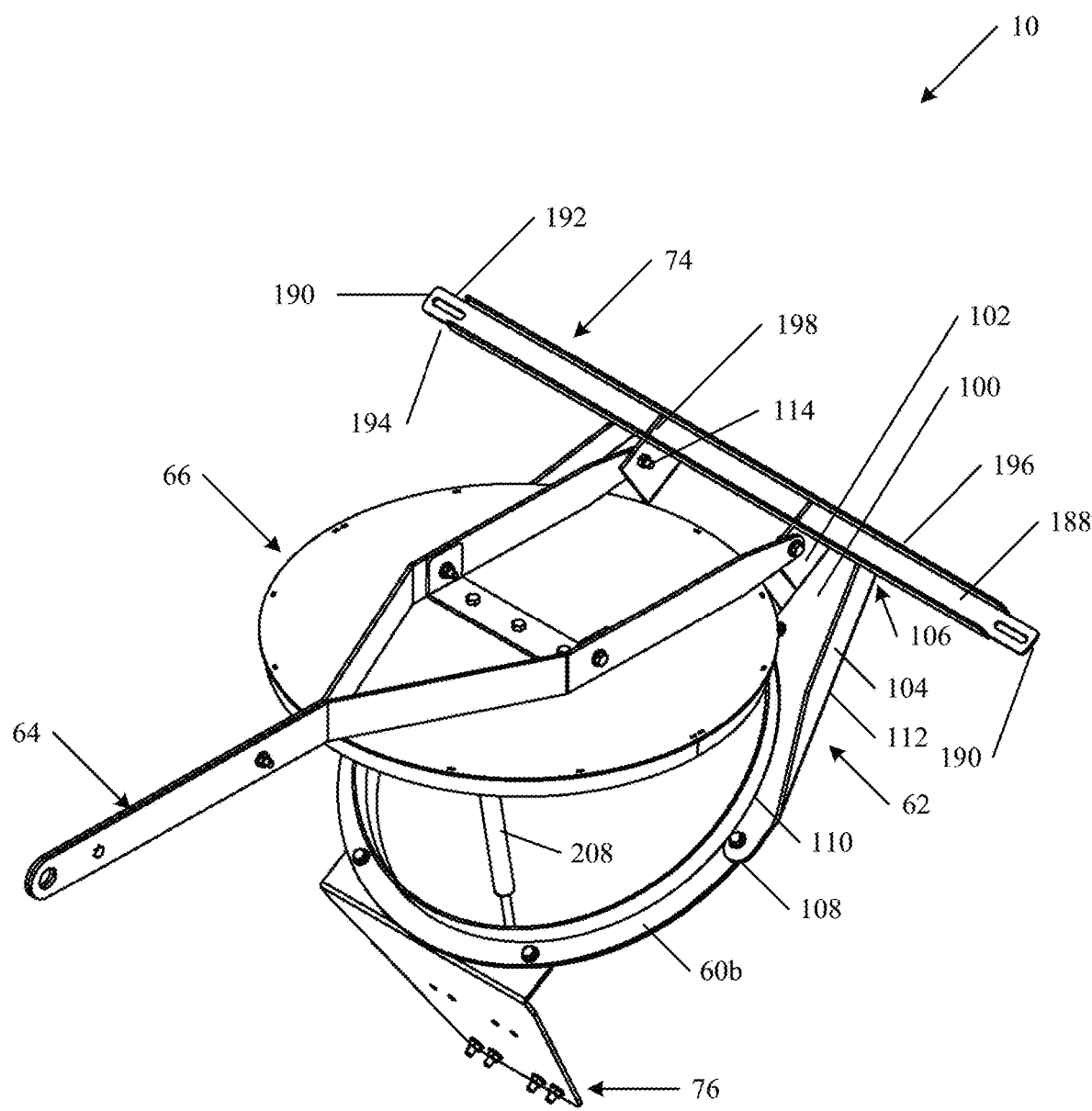
FIG. 14 is an assembled front right perspective view of a roof vent, in accordance with one or more embodiments; the view showing the roof vent with the lid in an open position.
Figure 15:
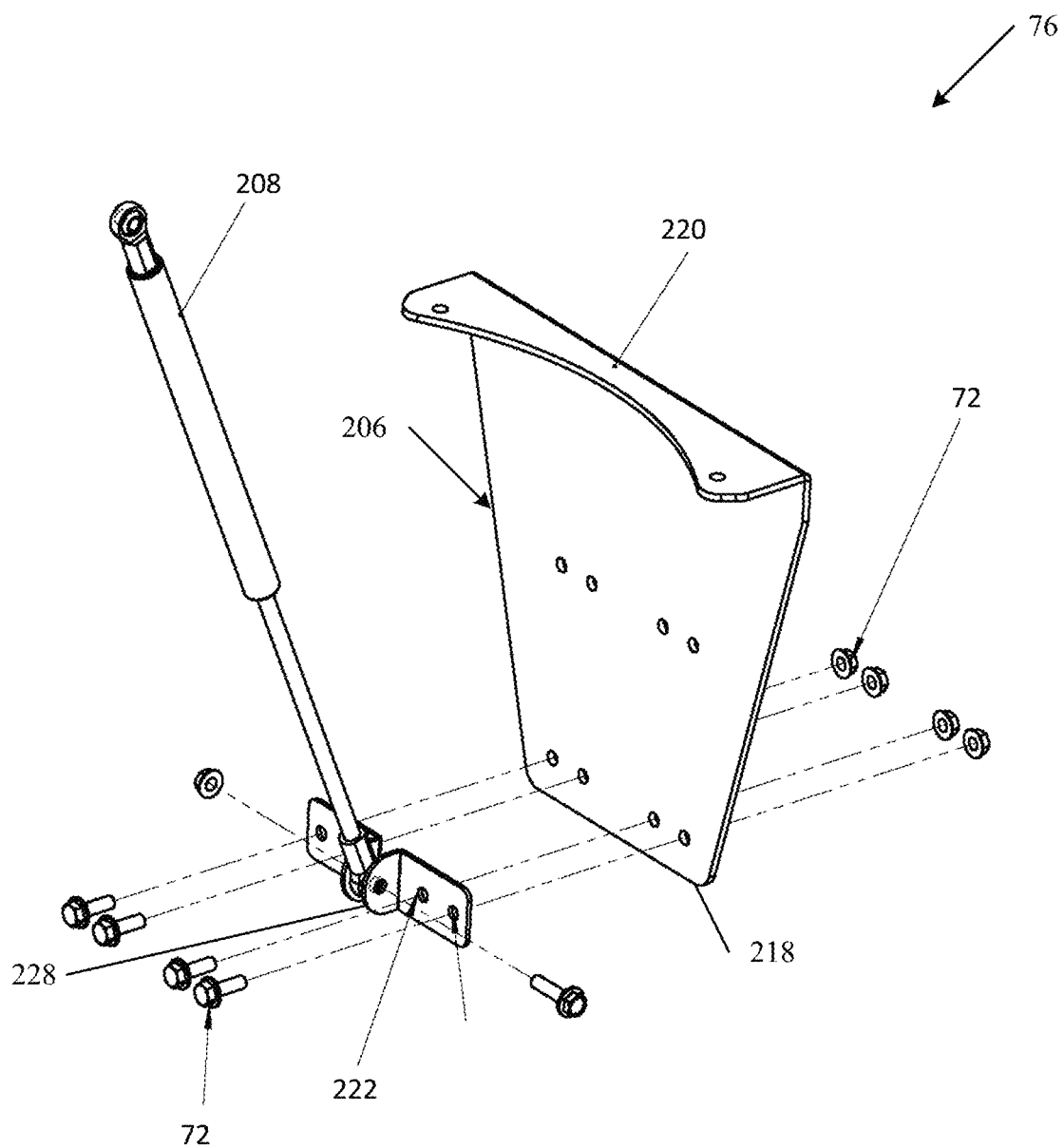
FIG. 15 is an exploded back left perspective view of a lower mount and a bias member of an interior mount assembly, in accordance with one or more embodiments.
Figure 16:
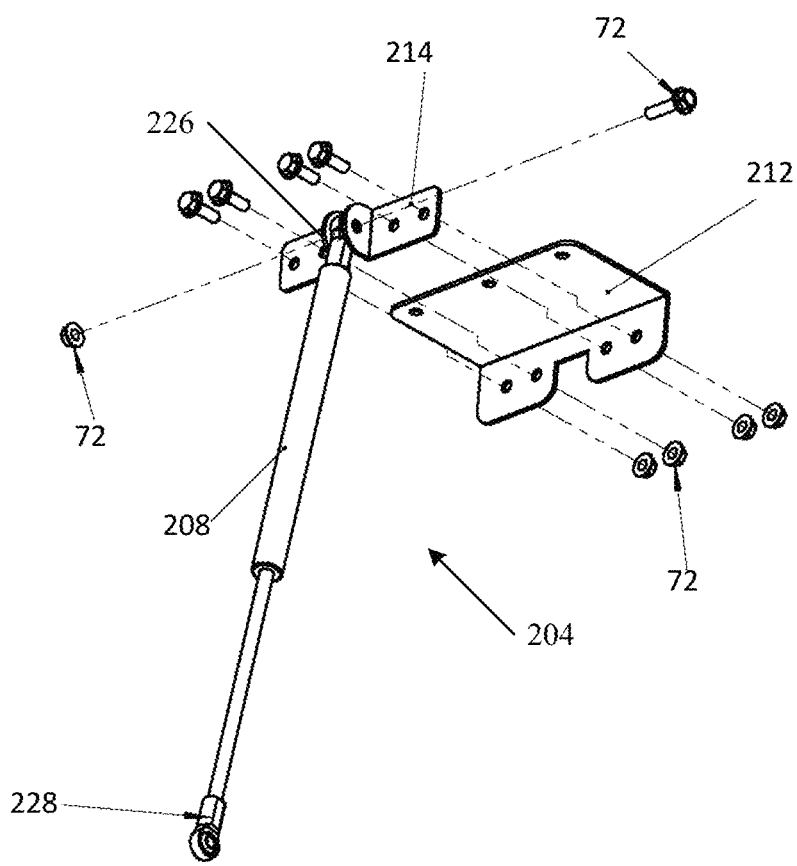
FIG. 16 is an exploded back left perspective view of an upper mount and a bias member of an interior mount assembly, in accordance with one or more embodiments.

Roof vent 50 may be installed in opening 44 as shown for example in FIGS. 13, 15, 16, and 17. Rings 60, exterior hinge member 62, and lower mount 206 of interior mount assembly 76 are attached to panel 34 as shown in FIG. 13. As an example process, rings 60 are positioned on opposing side of panel 34 and are attached at opposing sides of opening 44 using fasteners 72 that extend through flanges 88 of rings 60a and 60b and the panel 34. Lower mount 206 of interior mount assembly 76, is positioned on flange 88 of inner ring 60a at a lower end of opening 44 and attached using fasteners 72 that extend through interior mount assembly 76, flanges 88 of rings 60a and 60b and panel 34. Exterior hinge members 62 are positioned on outer ring 60b at an upper end of opening 44 and attached using fasteners 72 that extend through base 100 of exterior hinge members 62, flanges 88 of rings 60a and 60b, and panel 34.

Figure 17:
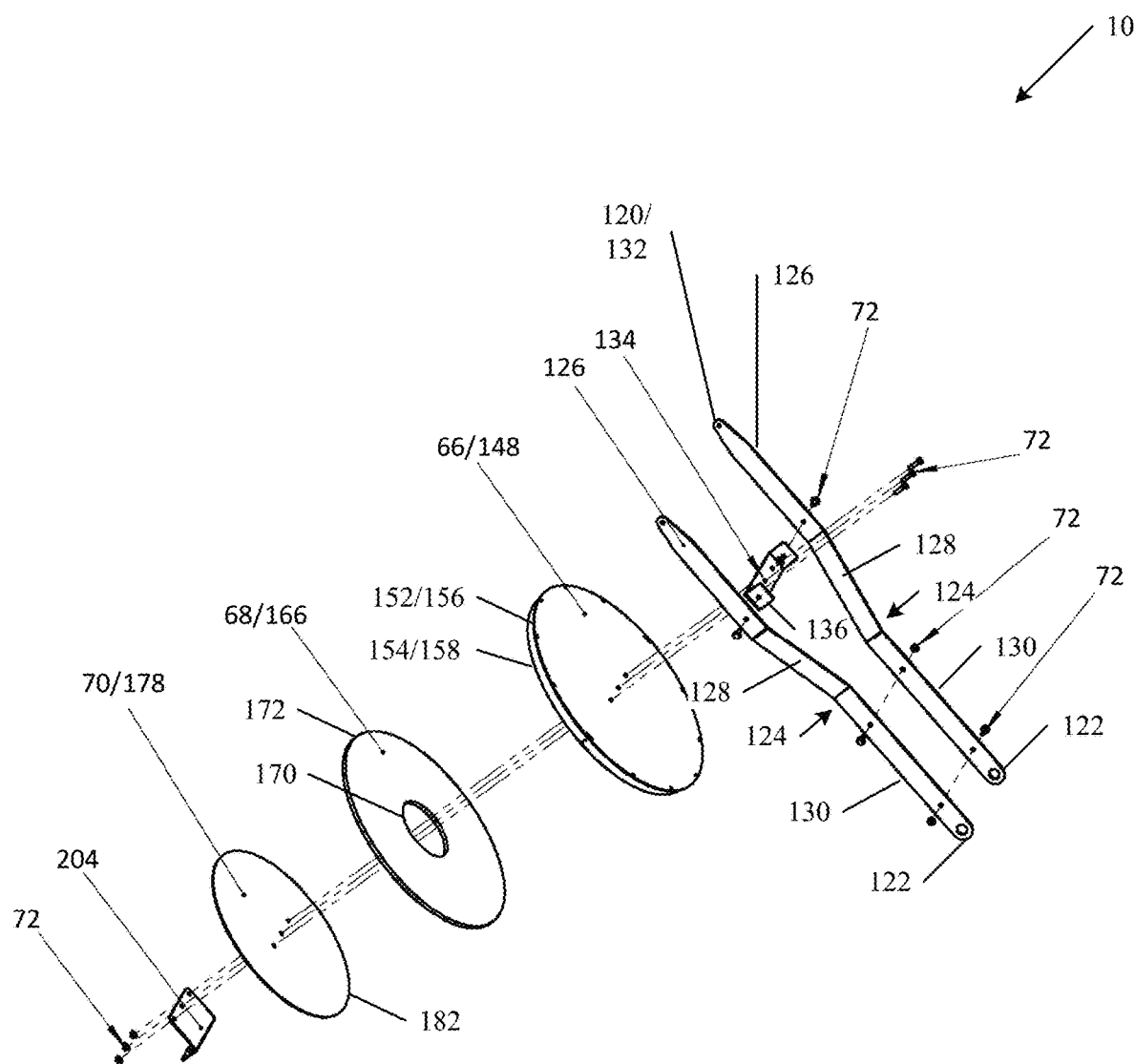
FIG. 17 is an exploded front left perspective view of a lid, a lever, a sealing member, and a support member of a vent, in accordance with one or more embodiments.
Figure 18:
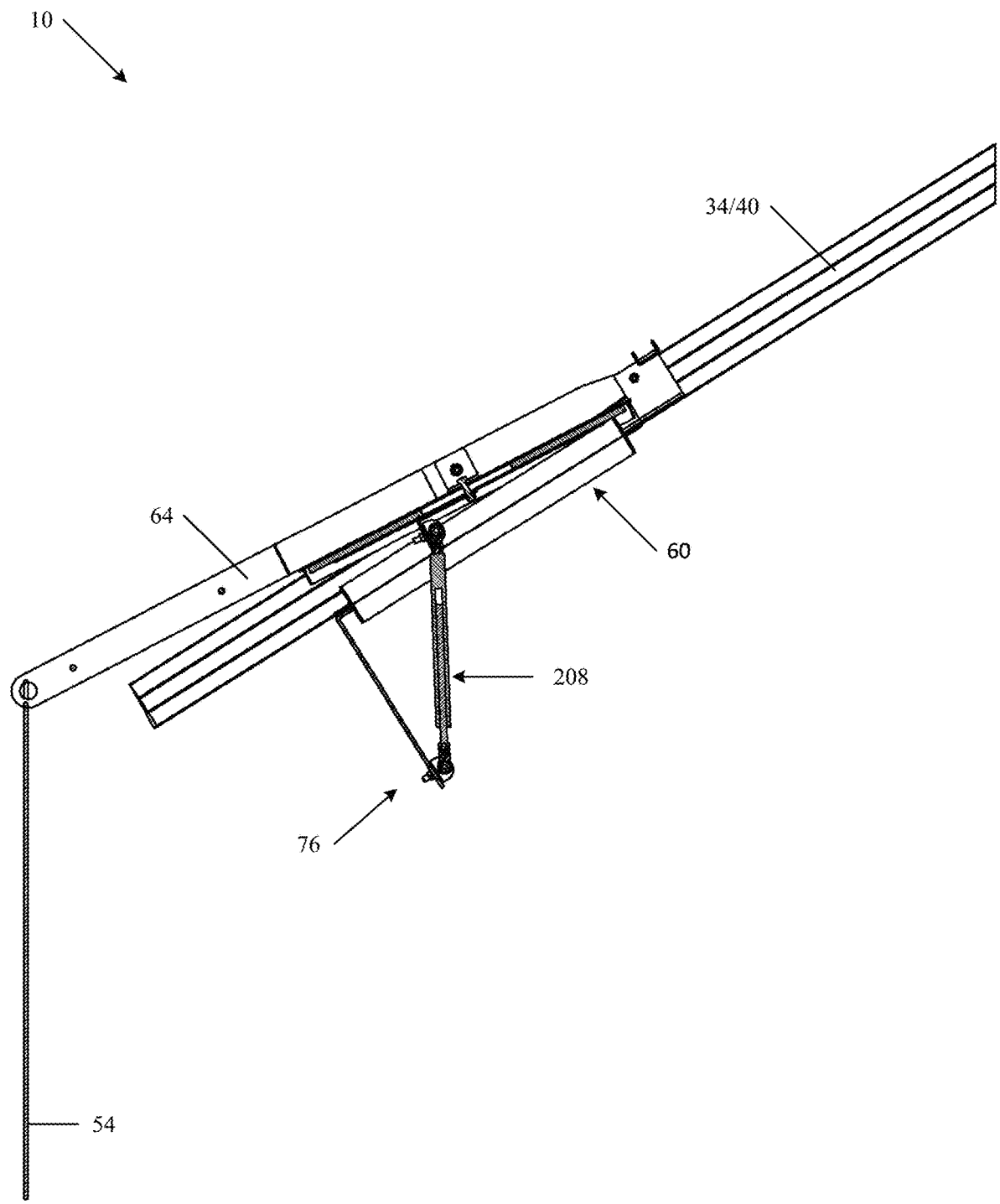
FIG. 18 is a right side cross-sectional view of a roof panel having a roof vent, in accordance with one or more embodiments; the view showing the roof vent in a partially open position.
Figure 19:
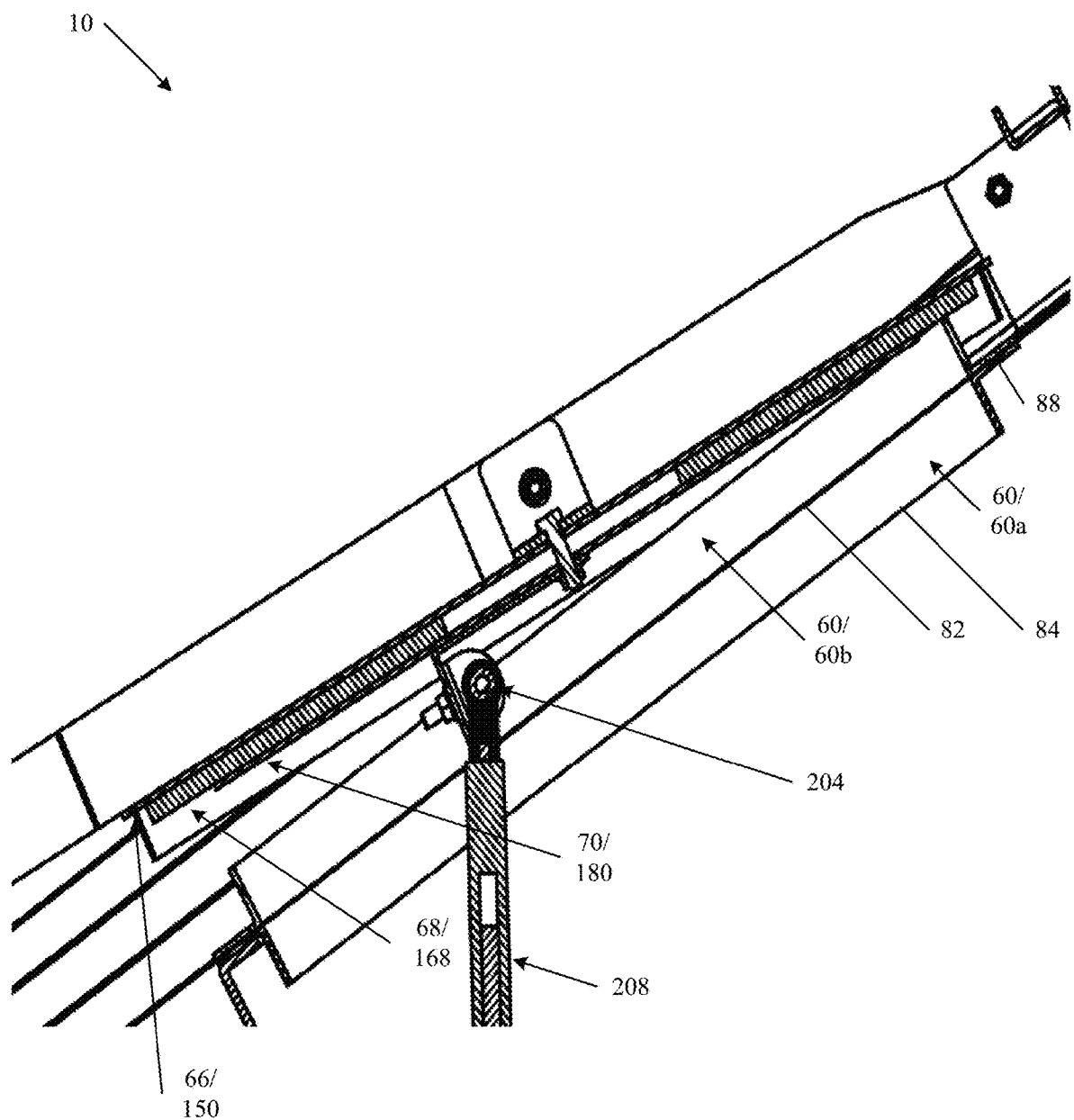
FIG. 19 is close up view of the roof vent shown in FIG. 18, in accordance with one or more embodiments.
Figure 20:
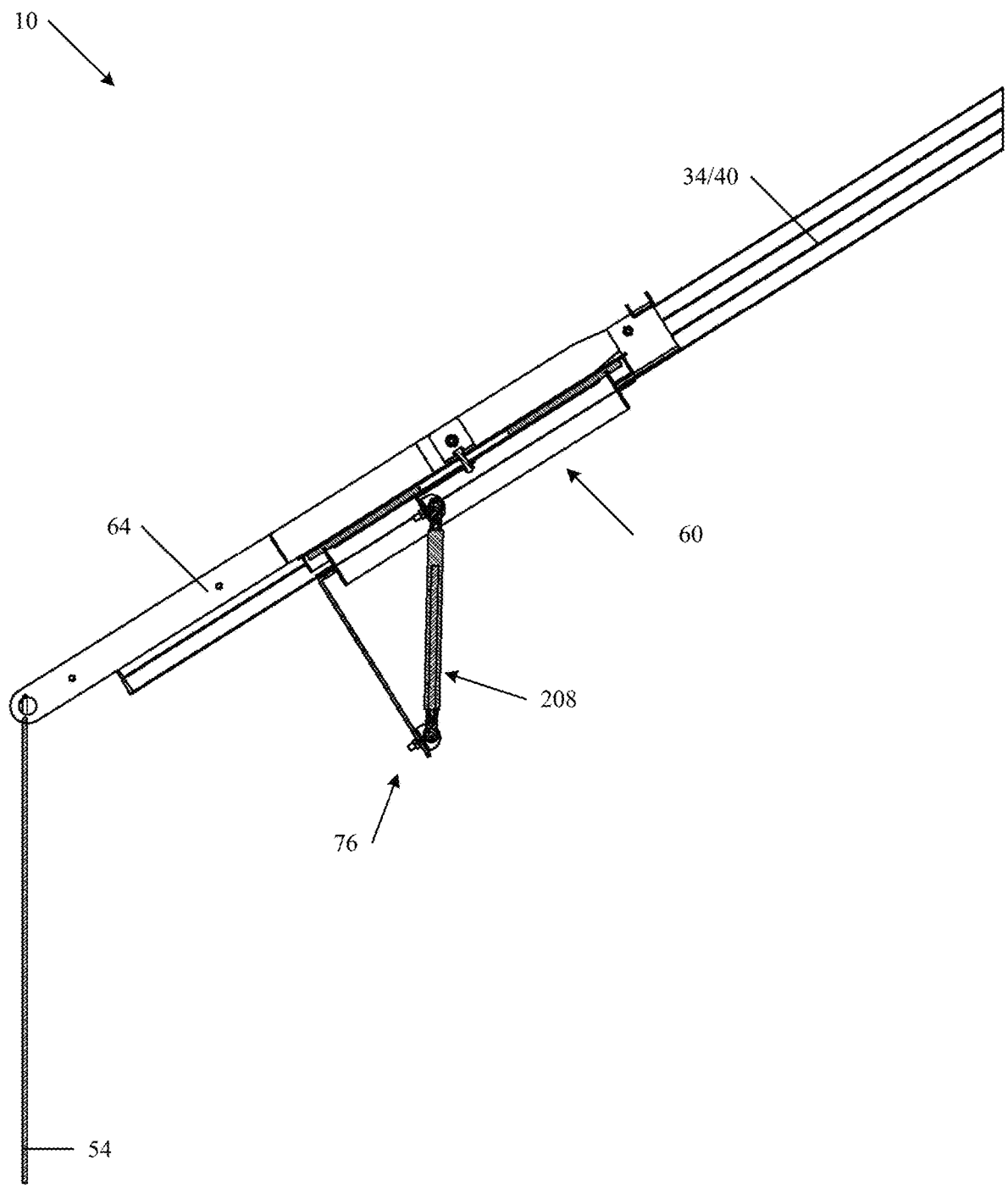
FIG. 20 is a right side cross-sectional view of a roof panel having a roof vent, in accordance with one or more embodiments; the view showing the roof vent with the lid in a closed position.
Figure 21:
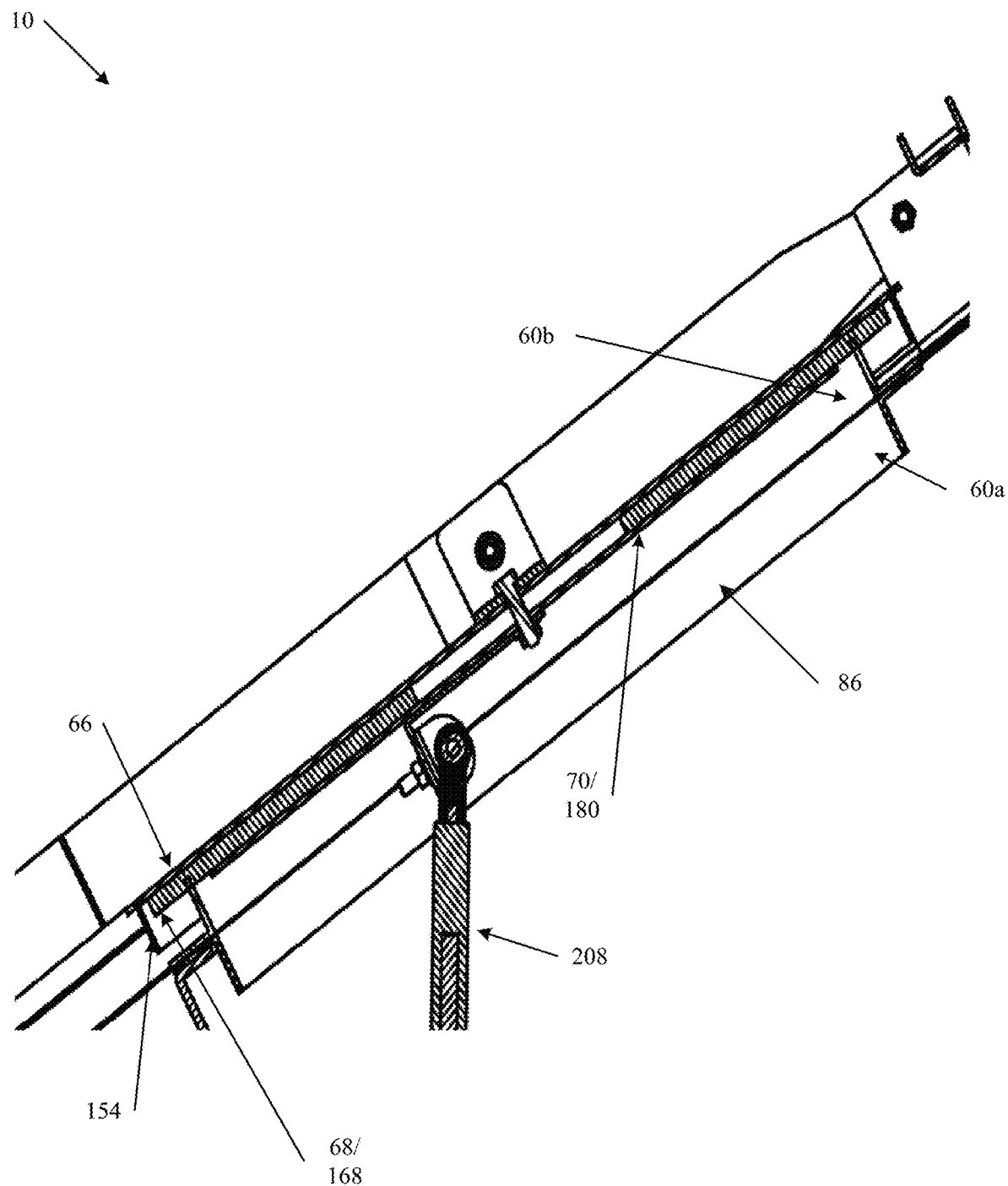
FIG. 21 is close up view of the roof vent shown in FIG. 20, in accordance with one or more embodiments; the view showing the sealing member held between the bottom surface of the lid and the upper surface of the support member; the view showing the bottom surface of the sealing member pinched between the bottom surface of the lid and the upper surface of the outer ring, thereby forming an airtight and/or completely airtight seal; the view showing the lower edge of the lip of the lid extending outside of and below the upper edge of the outer ring of the of the roof vent, thereby preventing water and debris from getting into the roof vent.
Figure 22:
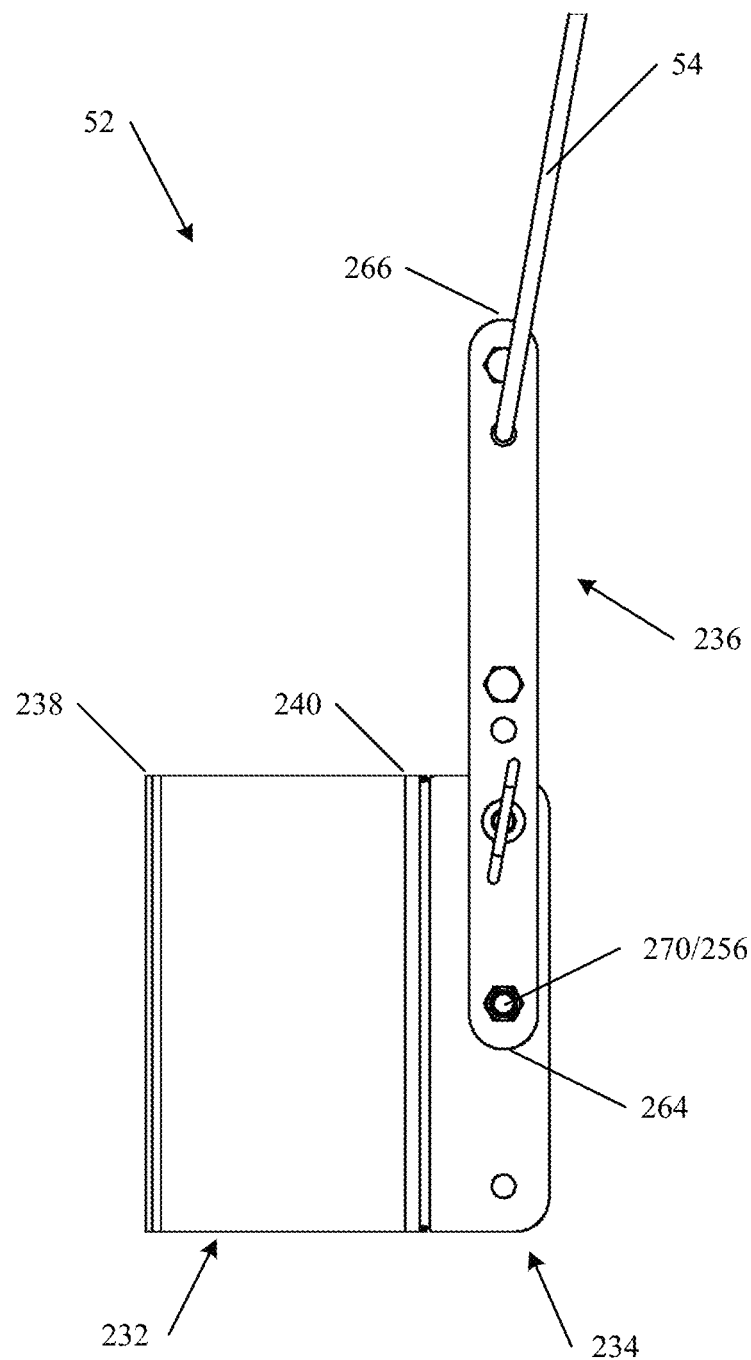
FIG. 22 is a left side view of a lever and pull for opening and closing of a lid of a roof vent, in accordance with one or more embodiments; the view showing the lever in a raised position for opening the lid of the roof vent.
Figure 23:
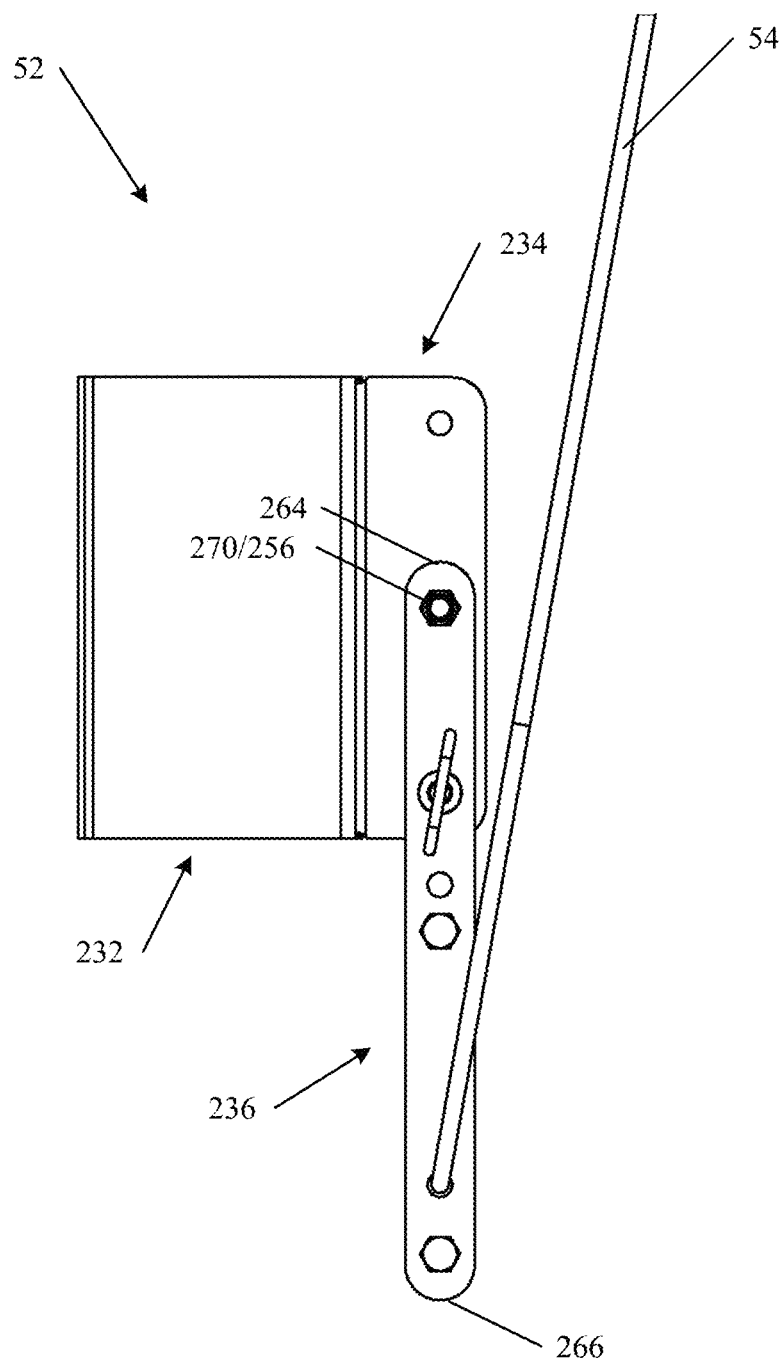
FIG. 23 is a left side view of a lever and pull for opening and closing of a lid of a roof vent, in accordance with one or more embodiments; the view showing the lever in a lowered position for closing the lid the roof vent.
Figure 24:
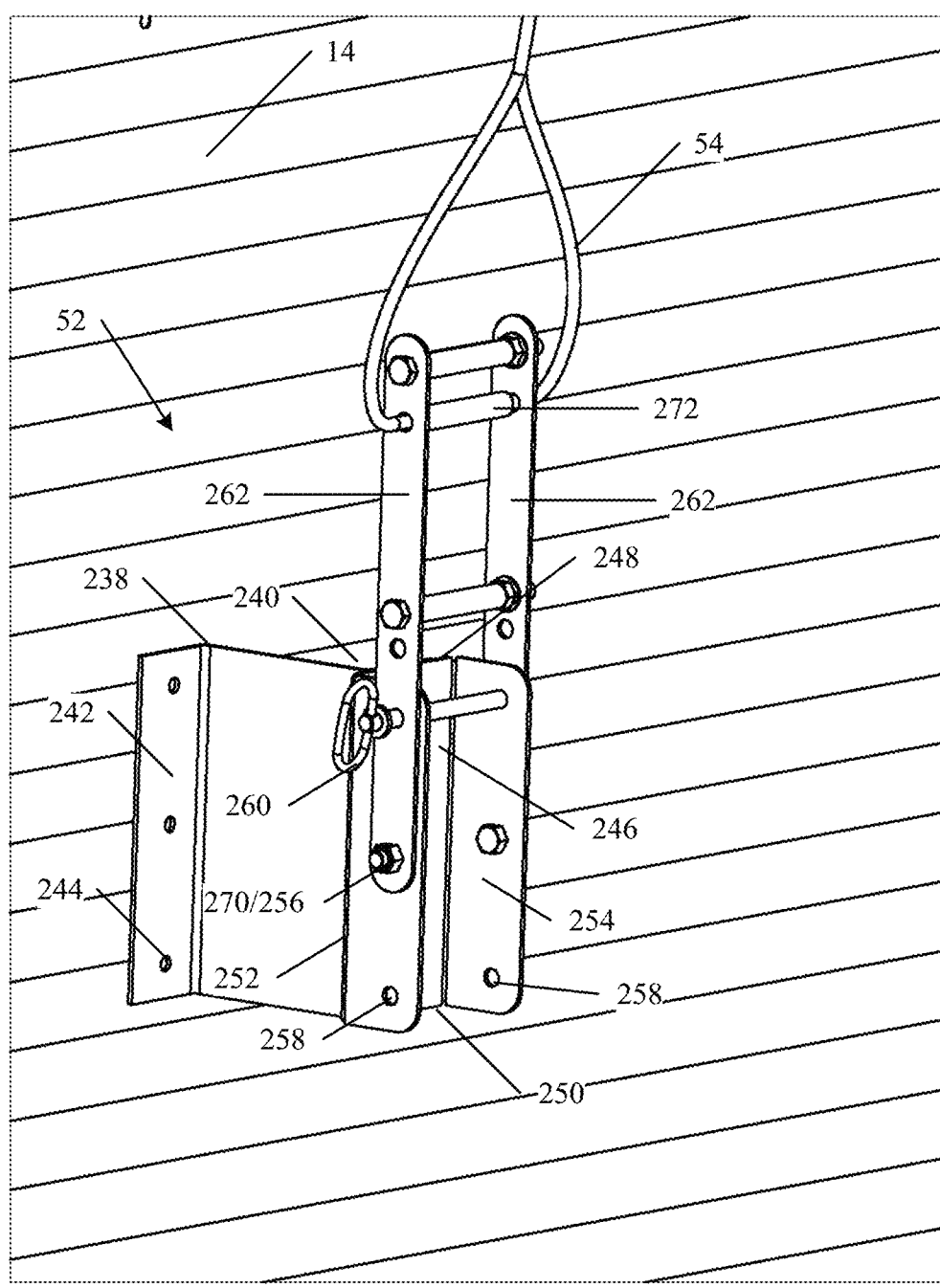
FIG. 24 is a front left perspective view of a lever and pull for opening and closing a lid of a roof vent, in accordance with one or more embodiments; the view showing the lever mounted on a sidewall of a grain bin; the view showing the lever in a raised position for opening the lid of the roof vent.
Figure 25:
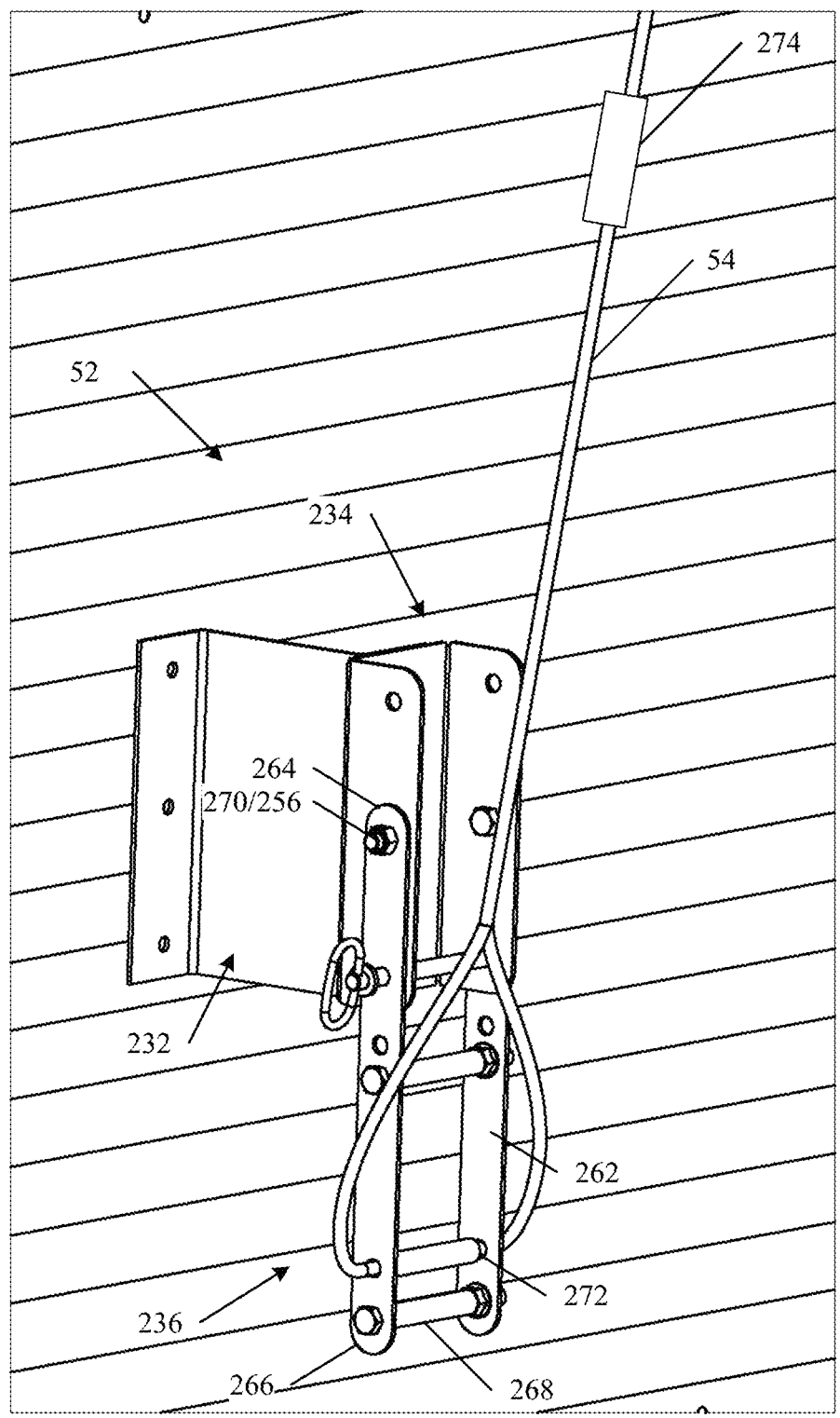
FIG. 25 is a front left perspective view of a lever and pull for opening and closing a lid of a roof vent, in accordance with one or more embodiments; the view showing the lever mounted on a sidewall of a grain bin; the view showing the lever in a lowered position for closing the lid the roof vent.

Lever 64, lid 66, sealing member 68, support member 70, and upper mount 204 of interior mount assembly 76 are assembled as shown in FIG. 17. As an example process, lever 64 may be assembled by connecting arms 124 together at lower section 126 and connecting cross bracket 134 to arms 124 at upper section 126. Lid 66, sealing member 68, support member 70, and upper mount of interior mount assembly 76 are attached to cross bracket 134 of lever 64 with fasteners 72 as shown in FIG. 17. Stabilizer 74 is positioned over exterior hinge member 62 and attached to ribs 40 on the sides of panel 34. Stabilizer 74 is attached to ribs 40 at ends 190 of stabilizer 74 using fasteners 72 that extend through stabilizer 74 and panels 34 of roof 18.

After assembly of lever 64, lid 66, sealing member 68, support member 70, and upper mount 204 of interior mount assembly 76, upper end 120 of lever 64 is attached to exterior hinge members 62 by connecting fasteners 72 through holes 114 of exterior hinge members 62 and holes 132 of lever 64. One end of pull 54 is attached to lower end 122 of lever 64 to complete assembly tasks at the level of roof 18.

On the ground, control lever 52 is positioned on sidewall 14 of grain bin 12 below lever 64. Control lever 52 may be attached to sidewall 14 using fasteners 72 that extend through sidewall 14 and holes 244 of flange 242 of standoff bracket 232 of control lever 52. Pull connector 272 of control lever 52 is connected to pull 54 at a position at which lid 66 of roof vent 50 is held in a closed position with an airtight and/or completely airtight seal when control lever 52 is moved to the lower position.

In operation, roof vent 50 is opened by a user by removing lock pin 260 of control lever 52 when control lever 52 is in a lowered position or closed position. Once lock pin 260 is removed, the user moves lever 236 of control lever 52 from a lower position (or closed position) to an upper position (or open position). Control lever 52 is moved by moving handle end 266 of lever 236, which is positioned below pivot end 264, upward. Upward movement of handle end 266 causes lever 236 to rotate at pivot end 264 about pivot connector 234 of control lever 52. Lever 236 is rotated until lever 236 becomes inverted with handle end 266 positioned above pivot end 264. As handle end 266 is moved upward, pull connector 272 is moved upward, releasing tension that is applied to pull 54 by control lever 52, and thereby reducing the downward force applied by pull 54 on lever 64 and lid 66 of roof vent 50.

As downward force applied on lever 64 and lid 66 of roof vent 50 is reduced, an opposing upward force is applied to lid 66 by bias member 208, which causes lower end 122 of lever 64 and lid 66 to move upward. As lower end 122 of lever 64 and lid 66 move upward, lever 64 and lid 66 pivot about a pivot point of fulcrum member 102 of exterior hinge member 62. Lid 66 and lever 64 are moved upward by bias member 208 until lid 66 and lever 64 reach an upper position or open position.

Roof vent 50 is locked in the open position by a user by inserting lock pin 260 through control lever 52 when control lever 52 is in an upper position (or open position). In this position, roof vent 50 is maintained in an upper position or open position by the bias force applied by bias member 208.

Conversely, in operation, roof vent 50 is closed by a user by removing lock pin 260 of control lever 52 when control lever 52 is in a raised position or open position. Once lock pin 260 is removed, the user moves lever 236 of control lever 52 from a raised position (or open position) to an lower position (or closed position). The user moves handle end 266 of lever 236, which is positioned above pivot end 264, downward with a force greater than that the upward bias force applied by bias member 208. Downward movement of handle end 266 causes lever 236 to rotate at pivot end 264 about pivot connector 234 of control lever 52. Lever 236 is rotated until it becomes reinverted so handle end 266 is positioned below pivot end 264. As handle end 266 is moved downward, pull connector 272 is moved downward, and tension or downward force is applied to pull 54 by control lever 52. The downward force applied to pull 54 is transferred by pull 54 to lever 64 and lid 66 of roof vent 50.

When downward force applied on lever 64 and lid 66 of roof vent 50 become greater than the upward force applied to lid 66 by bias member 208, lower end 122 of lever 64 and lid 66 are moved downward. As lower end 122 of lever 64 and lid 66 move downward, lever 64 and lid 66 pivot about a pivot point of fulcrum member 102 of exterior hinge member 62. Lid 66 and lever 64 are moved downward by pull 54 until sealing member 68, attached to the bottom of lid 66, engages the upper end of outer ring 60b of roof vent 50. As further downward force is applied on lid 66 and lever 64 by pull 54, lid 66 is moved further downward to a closed position and sealing member 68 is compressed between lid 66 and the upper end of outer ring 60b to form an airtight and/or completely airtight seal.

In this example, once a user has moved control lever 52 to the desired upper or lower position, the user may insert lock pin 260 into a lock pin hole 258 to lock control lever in position which is where the control lever 52 and roof vent 50 will stay until another user initiated move occurs.

It is to be noted that the length of control lever 52 as well as the length of lever 64 of lid 66 of roof vent 50 provide the user with mechanical advantage that allow for a force multiplier that helps to form a secure and airtight and/or completely airtight seal between sealing member 68 and the upper end of outer ring 60b. This facilitates forming an airtight and/or completely airtight seal in an easier manner, in a faster manner, in a foolproof manner and in a more-secure manner while providing a simple to use and ergonomic system for a user. In addition, the system 10 uses only one pull 54 which operates both the opening and closing of the roof vent 50, thereby eliminating the need for an opening pull and a closing pull or other more-sophisticated mechanical arrangements.

Actuator Assembly 276

Figure 26:
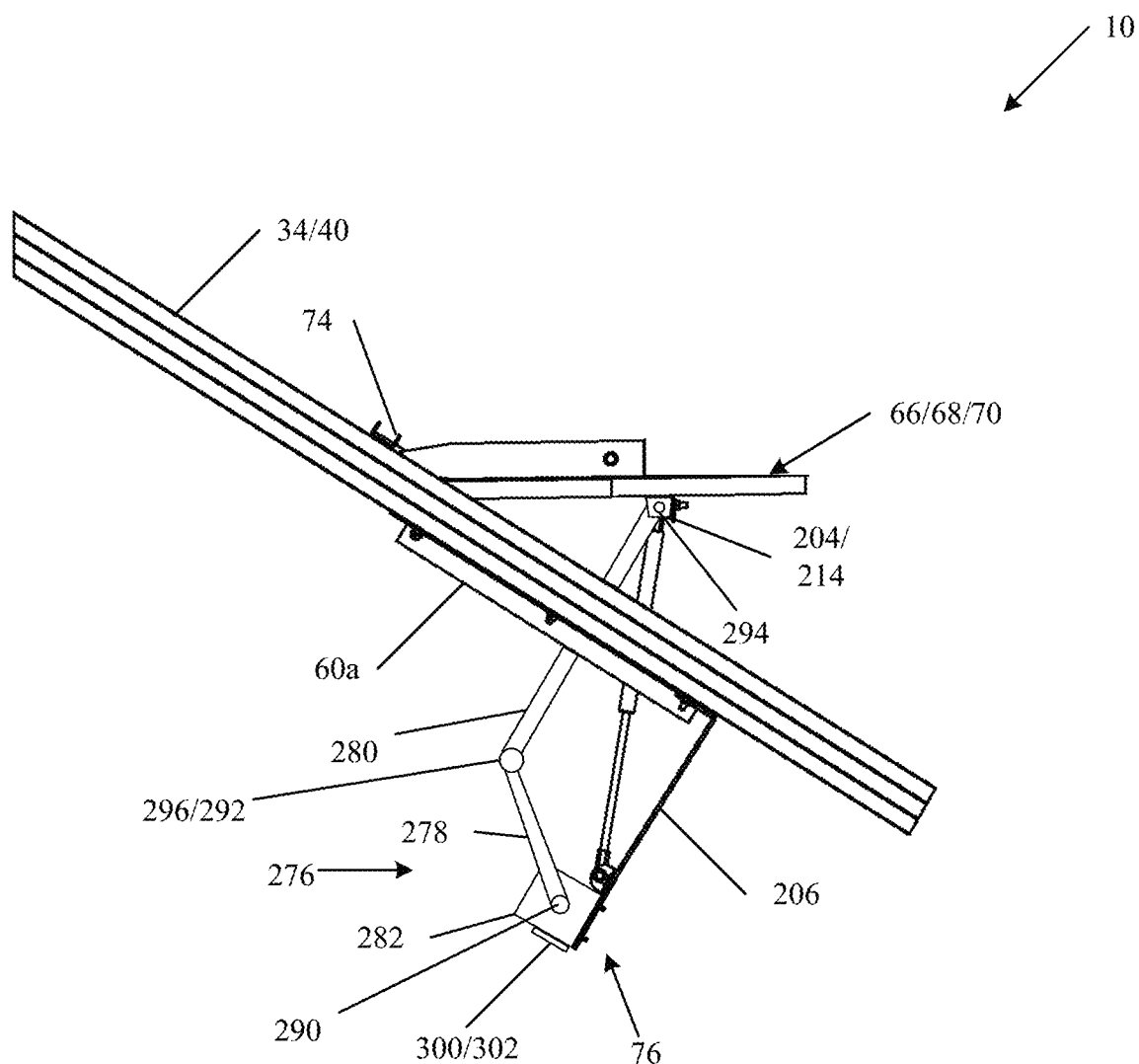
FIG. 26 is a left side view of a roof panel having a roof vent, in accordance with one or more embodiments; the view showing the roof vent with the lid in an open position; the view showing an example actuator assembly and bias member to facilitate opening and closing the roof vent.
Figure 27:
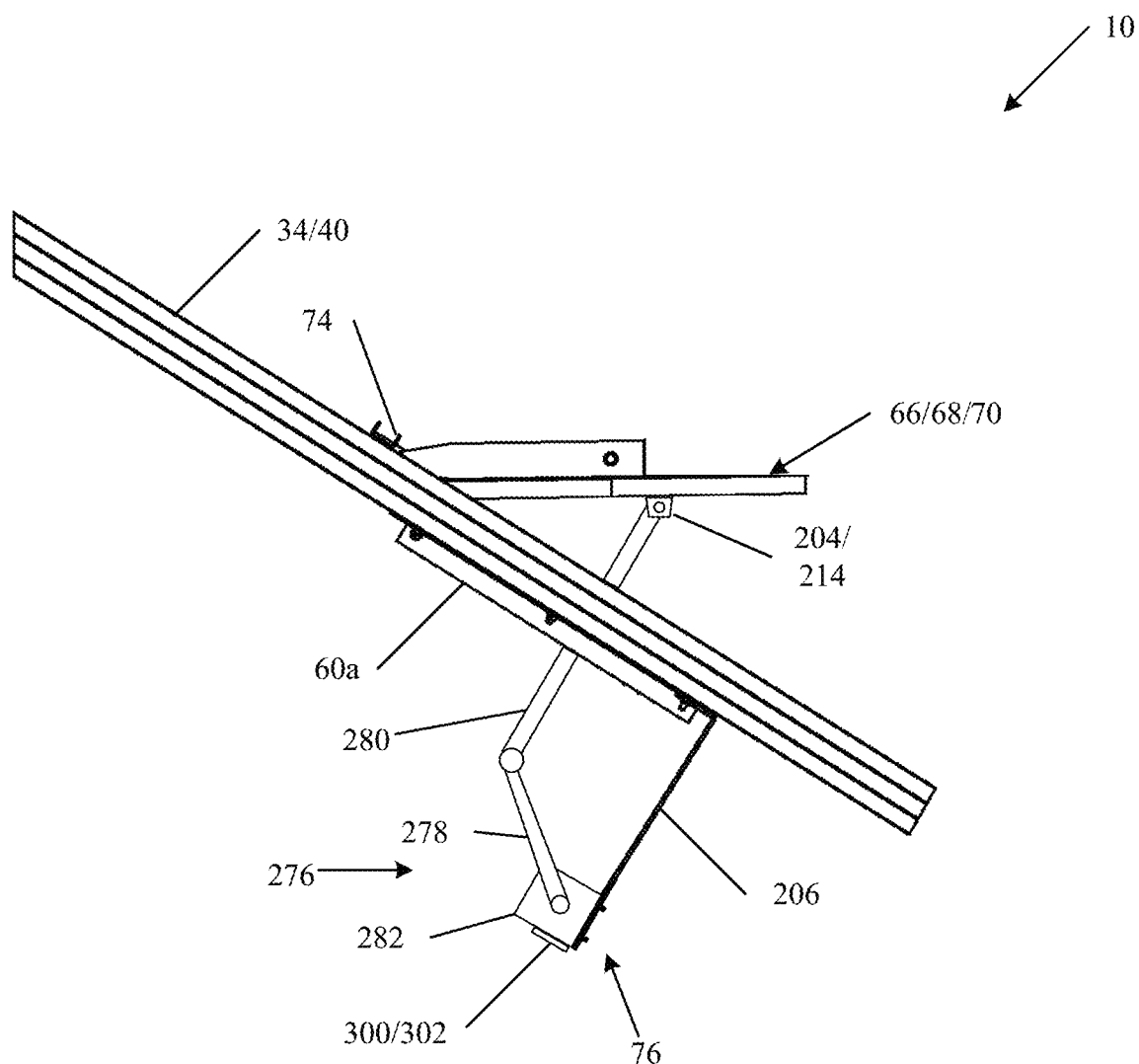
FIG. 27 is a left side view of a roof panel having a roof vent, in accordance with one or more embodiments; the view showing the roof vent with the lid in an open position; the view showing an example actuator assembly to facilitate opening and closing the roof vent with bias member omitted.

In one or more arrangements, system 10 includes an actuator assembly 276 to facilitate automated opening and closing of roof vent 50. Actuator assembly 276 is formed of any suitable size, shape, and design and is configured to apply force to roof vent 50 to move roof vent 50 between the open position and closed position as desired by a user. In some example arrangements shown in FIGS. 26-28, actuator assembly is connected to roof vent 50 to facilitate opening and closing of lid 66. In these example arrangements, actuator assembly 276 includes an actuator 282, an arm 278 connected to the actuator 282, and a link 280 operably connecting the arm 278 to upper mount 204 connected to lid 66 of roof vent 50, among other components.

Actuator 282 is formed of any suitable size, shape, and design and is configured to generate movement to facilitate movement of roof vent 50. In various arrangements, actuator 282 may be implemented by various means and method known in the art, including but not limited to, for example, linear actuators, rotary actuators, motors, solenoids and other electro mechanical actuators, hydraulic driven actuators, pneumatic actuators thermal and magnetic actuators, and/or polymer actuators, to name a few. In one example arrangement shown, actuator 282 is a motor driven rotary actuator attached to lower mount 206.

Arm 278 is formed of any suitable size, shape, and design and is configured to operably connect a rotary output of the actuator to link 280. In the arrangement shown arm 278 has a generally elongated rectangular shape extending from an inner end 290, connected to an output axel of the actuator, to an outer end 292, connected to a lower end link 280.

Link 280 is formed of any suitable size, shape, and design and is configured to operably connect arm 278 with lid 66 of roof vent 50. In the arrangement shown, as one example, link 280 has a generally elongated rectangular shape extending from an upper end 294, where link 280 is pivotally connected to lid 66 of roof vent 50, to a lower end 296, where link 280 is pivotally connected to outer end 292 of arm 278. In this example arrangement, rotation of the output axel of actuator 282 rotates arm 278, which in turn causes link 280 to be moved up/down, thereby opening or closing lid 66 of roof vent 50.

Figure 28:
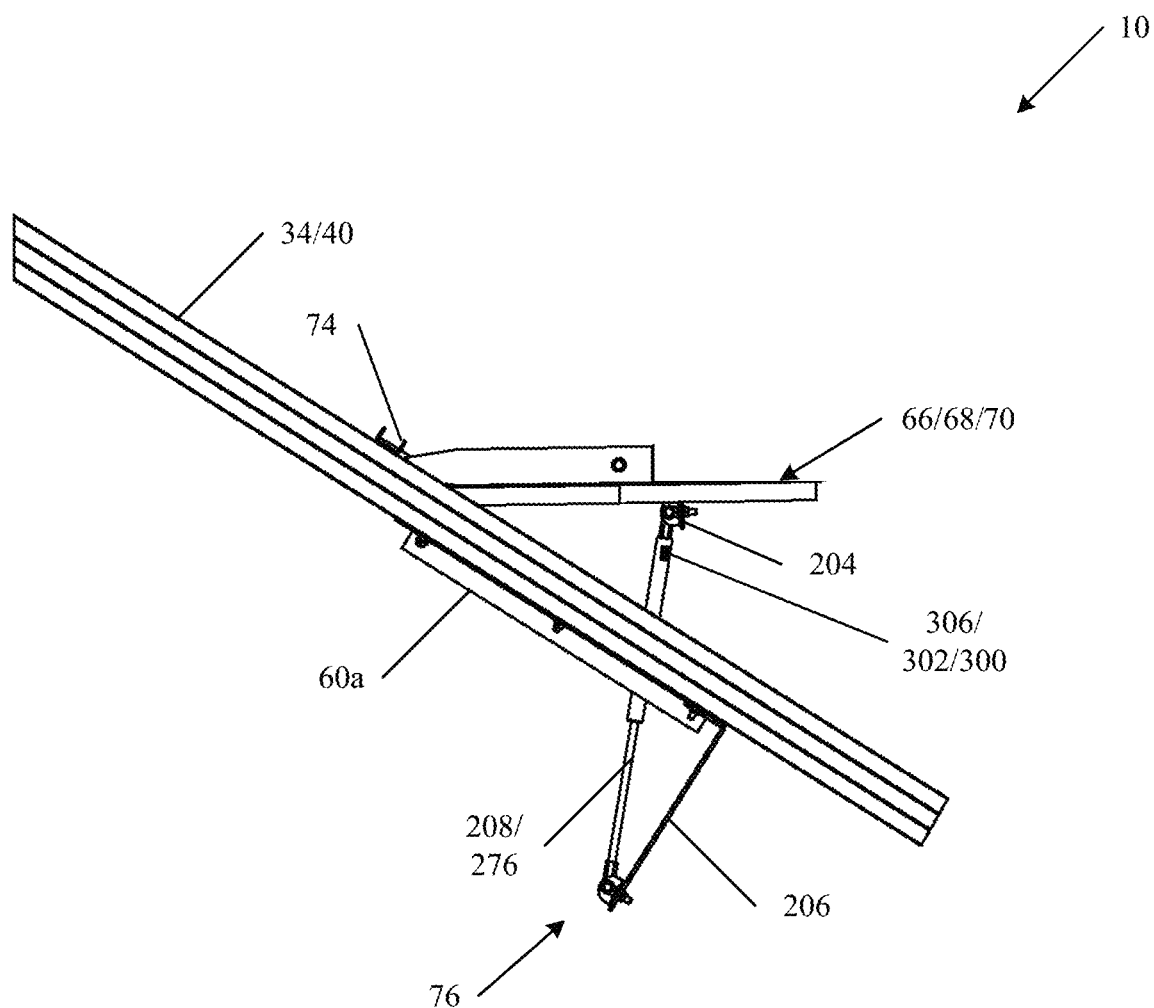
FIG. 28 is a left side view of a roof panel having a roof vent, in accordance with one or more embodiments; the view showing the roof vent with the lid in an open position; the view showing an actuator and bias member to facilitate opening and closing the roof vent; the view showing the example actuator assembly and the bias member formed together as a unitary component.

In one or more arrangements, movement of lid 66 of roof vent 50 by actuator assembly 276 is assisted by bias member 208. For example, in one or more arrangements, bias member is configured to provide an upward biasing force to lid 66 approximately equal to the downward force applied by the weight of lid 66 to facilitate holding lid 66 in any position between the open position and closed position. Applying such biasing force to lid 66 permits actuator assembly 276 to open or close lid 66 with smaller amounts of force than would otherwise be required. In this manner, actuator assembly 276 may be implemented using a smaller actuator 282, which may reduce manufacturing costs, power usage, and/or space requirements. However, the embodiments are not so limited. Rather, it is contemplated that in one or more arrangements bias member 208 may be omitted, as shown, in FIG. 27. Additionally or alternatively, in one or more arrangements, bias member 208 and actuator assembly 276 may be implemented together as a single component, as shown in FIG. 28. In the arrangements shown in FIGS. 26-28, lever 64 of roof vent 50 and pull 54 are omitted.

However, the embodiments are not so limited. Rather, it is contemplated that in one or more arrangements, roof vent 50 may include actuator assembly 276 as well as lever 64 and pull 54 to facilitate opening and or closing of the roof vent 50.

Figure 29:
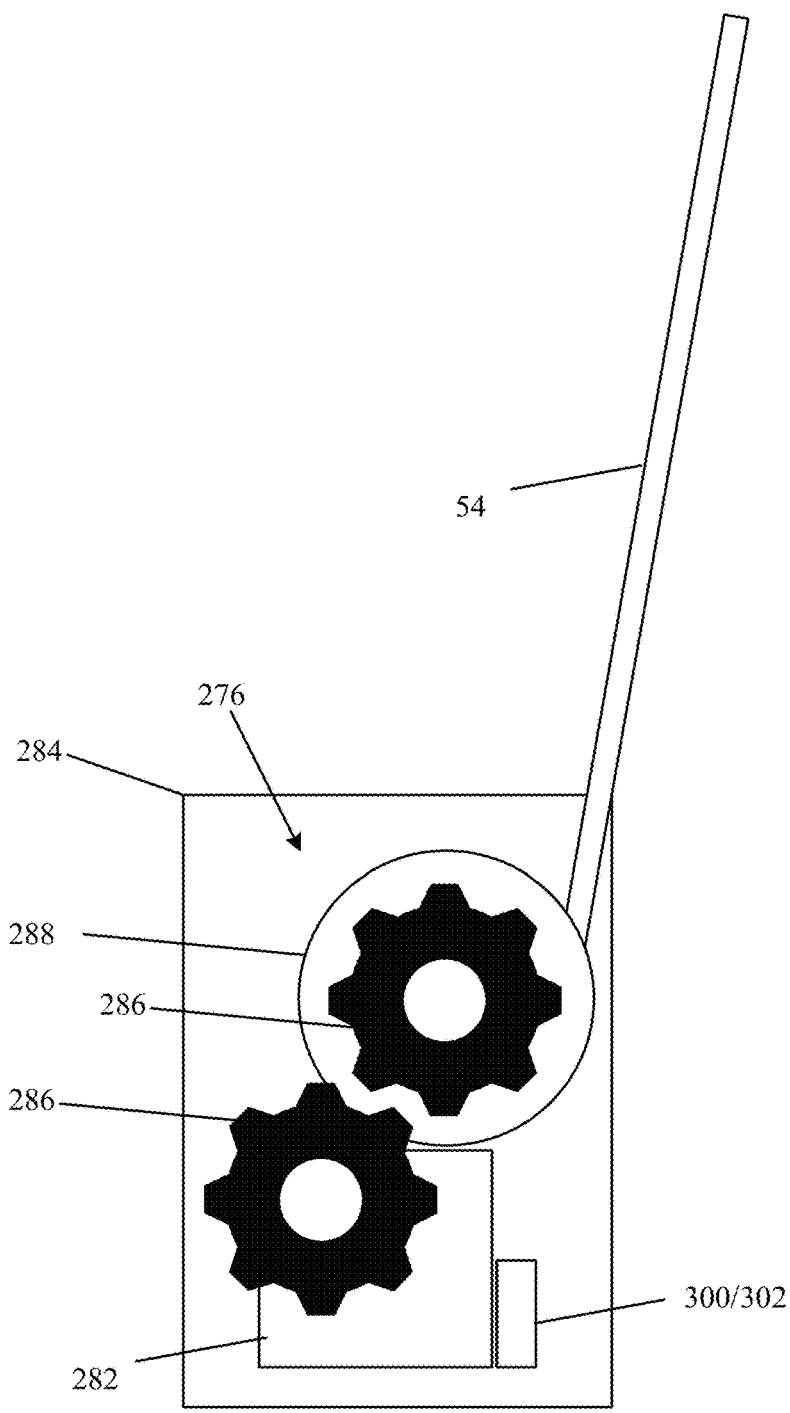
FIG. 29 shows an example actuator assembly for use with a roof vent, in accordance with one or more embodiments; the view showing the actuator assembly open or close the roof vent by raising or lowering pull.
Figure 30:
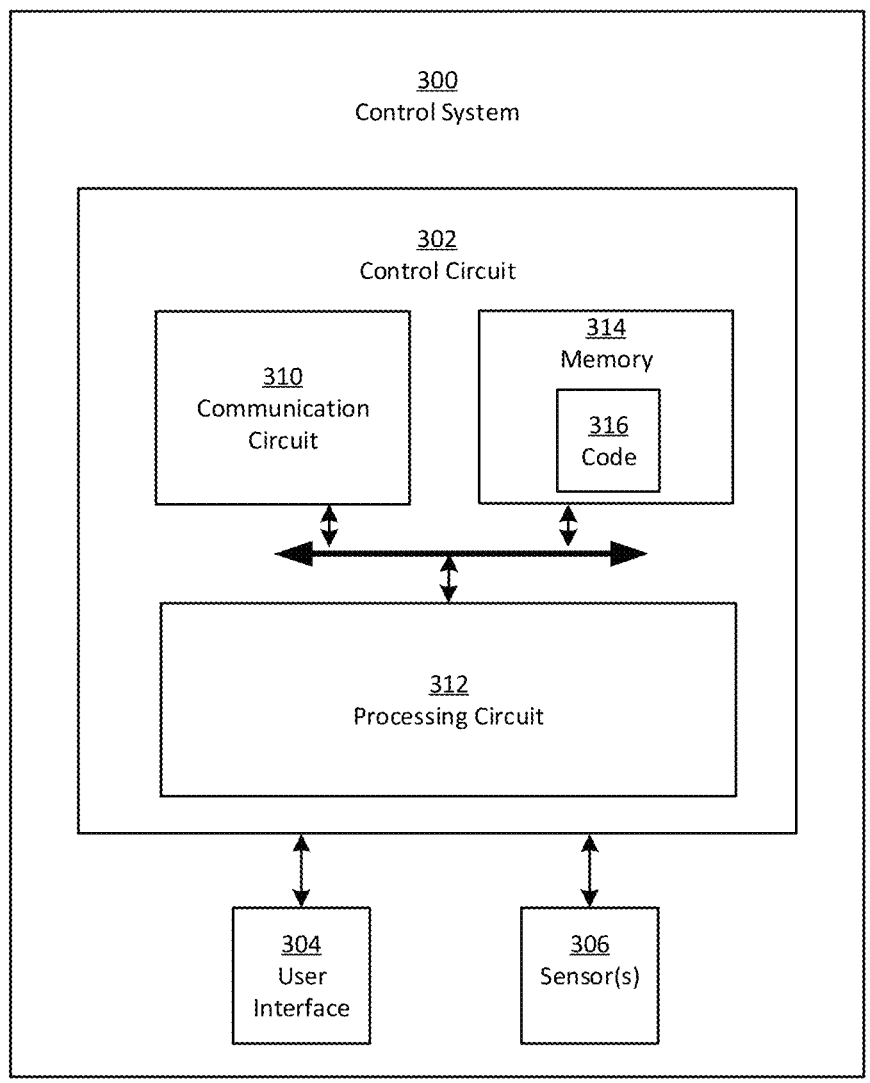
FIG. 30 shows a block diagram of an example control system, in accordance with one or more embodiments.

Additionally or alternatively, in one or more arrangements, actuator assembly 276 may be positioned on a side of grain bin 12 and connected to a lower end of pull 54 to facilitate opening and/or closing of the roof vent 50 in lieu of or in addition to control lever 52. For example, FIG. 29 shows an example actuator assembly 276 configured to wind or unwind pull 54 onto or from spool 288 to facilitate opening and/or closing of the roof vent 50. In this example arrangement, actuator assembly 276 is positioned within an actuator housing 284 and includes actuator 282, spool 288 and gears 286 which operably connect actuator 282 to spool 288. In this example arrangement, rotation of an output axle of actuator 282 causes gears 286 to rotate spool 288, and thereby wind or unwind pull 54 onto or from spool 288.

In some various different arrangements, actuator 282 may be controlled by various switches, circuits, and/or systems to facilitate automated and/or user initiated opening and/or closing of roof vents. In one or more arrangements, actuator(s) 282 are communicatively connected (via wired or wireless connection) to a control system 300 and/or control circuit 302, which is configured to control operation of actuator(s) 282.

Control System 300

In one or more arrangements, system 10 includes a control system 300. Control system 300 is formed of any suitable any suitable size, shape, and design and is configured to control operation of actuator assembly(ies) 276 and/or other components of system 10 to facilitate monitoring environmental conditions and/or closing and/or opening of roof vents 50 signals in response to signals from sensors 306 and/or input from user interface 304. In the arrangement shown, as one example, control system 300 includes a control circuit 302, user interface 304, and/or sensors 306, among other components.

Control Circuit 302

Control circuit 302 is formed of any suitable size, shape, design and is configured to control operation of actuator 282 and/or other components of system 10 to facilitate closing and/or opening of roof vent(s) 50 in response to signals of sensors 306 and/or input from user interface 304. In the arrangement shown, as one example implementation, control circuit 302 includes a communication circuit 310, a processing circuit 312, and a memory 314 having software code 316 or instructions that facilitates the operation of system 10.

Processing circuit 312 may be any computing device that receives and processes information and outputs commands according to software code 316 stored in memory 314. For example, in some various arrangements, processing circuit 312 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 314. Memory 314 may be any form of information storage such as flash memory, ram memory, dram memory, a hard drive, or any other form of memory.

Processing circuit 312 and memory 314 may be formed of a single combined unit. Alternatively, processing circuit 312 and memory 314 may be formed of separate but electrically connected components. Alternatively, processing circuit 312 and memory 314 may each be formed of multiple separate but communicatively connected components.

Software code 316 is any form of instructions or rules that direct processing circuit 312 how to receive, interpret and respond to information to operate as described herein. Software code 316 or instructions is stored in memory 314 and accessible to processing circuit 312. As an illustrative example, in one or more arrangements, software code 316 or instructions may configure processing circuit 312 control circuit 302 to monitor sensors 306 and perform various preprogramed actions in response to signals from sensors 306 satisfying one or more trigger conditions.

As some illustrative examples, some actions that may be initiated by control circuit 302 in response to signals from sensors 306 and/or user input from user interface 304 include but are not limited to, for example, opening and/or closing individual or multiple roof vents 50, controlling augers and conveyors of loading and/or unloading systems, controlling grain dryers, controlling environmental control systems (not shown) (e.g., temperature control systems, air circulation systems, fumigation systems, and/or preservative application systems), and/or sending notifications to users (e.g., emails, SMS, push notifications, automated phone call, social media messaging, and/or any other type of messaging). However, the embodiments are not so limited.

Communication circuit 310 is formed of any suitable size, shape, design, technology, and in any arrangement and is configured to facilitate communication with devices to be controlled, monitored, and/or alerted by control system 300. In one or more arrangements, as one example, communication circuit 310 is a includes a transmitter (for one-way communication) or transceiver (for two-way communication). In various arrangements, communication circuit 310 may be configured to communicate with various components of system 10 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

Sensors 306

Sensors 306 are formed of any suitable size, shape, design, technology, and in any arrangement configured to measure environmental conditions that may affect storage of contents of grain bin 12. In some various arrangements, sensors 306 may include but are not limited to, for example, position sensors (e.g., indicative whether roof vents 50 are in an open or closed position), temperature sensors, humidity sensors, moisture sensors, chemical sensors, and/or any other type of sensor. In some arrangements, sensors 306 may be formed along with control circuit 302 as a single combined unit. Alternatively, in some arrangement sensors 306 and control circuit 302 may be communicatively connected by communication circuit 310.

User Interface 304

User Interface is formed of any suitable size, shape, design, technology, and in any arrangement and is configured to facilitate user control and/or adjustment of various components of system 10. In one or more arrangements, as one example, user interface 304 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface includes a display (not shown). Display is formed of any suitable size, shape, design, technology, and in any arrangement and is configured to facilitate display information of settings, sensor readings, time elapsed, and/or other information pertaining to proper storage of contents of grain bin 12. In one or more arrangements, display may include, for example, LED lights, meters, gauges, screen or monitor of a computing device, tablet, and/or smartphone. Additionally or alternatively, in one or more arrangements, the inputs and/or display may be implemented on a separate device that is communicatively connected to control circuit 302. For example, in one or more arrangements, operation of control circuit 302 may customized using a smartphone or other computing device that is communicatively connected to the control circuit 302 (e.g., via Bluetooth, WIFI, and/or the internet).

In Operation

Figure 31:
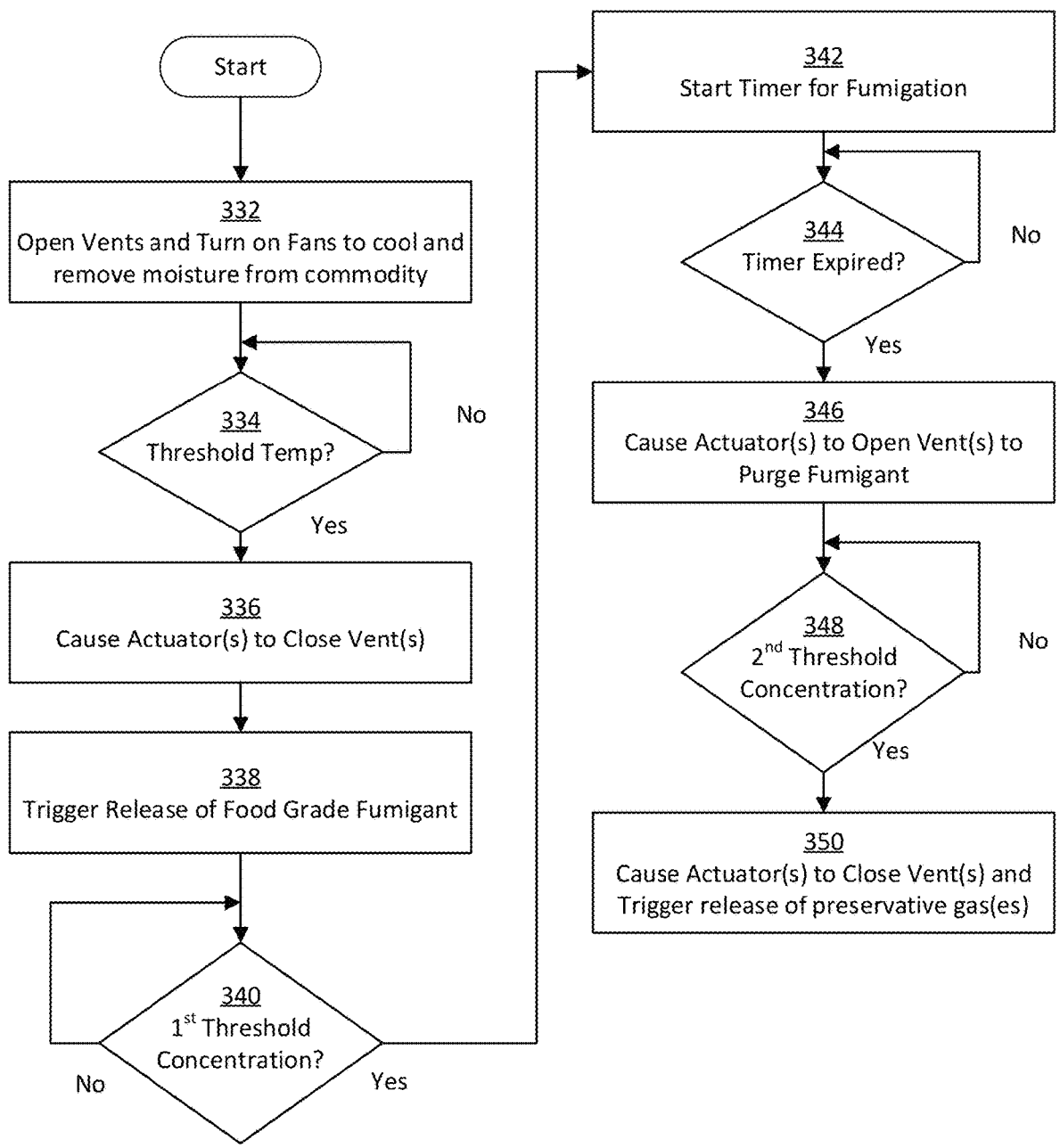
FIG. 31 shows an example automated process performed by control system, in accordance with one or more embodiments.

As an illustrative example, FIG. 31 show a flow diagram of an example automated process that may be performed by a control system 300 in one or more arrangements. The process may be initiated by a user following loading of a commodity from a dryer in into grain bin 12. In this example, the control system 300 causes actuators 282 to open roof vents 50 and turns on an air circulation system at process block 332 to cool and remove moisture from the commodity. The process then holds at decision block 334 until a threshold temperature is reached. Once the threshold temperature is reached, the process proceeds to process block 336, where control system 300 causes actuator(s) 282 to close roof vents 50. At process block 338, control system 300 causes a fumigation system to release a food grade fumigant into grain bin 12. At decision block 340, control system 300 monitors concentration of the fumigant in grain bin 12 using one or more sensors until a first threshold concentration is reached. Once the first threshold concentration is reached, control system 300 initiates a timer at process block 342, to ensure that fumigate is applied for a sufficient amount of time to be effective (e.g., as instructed by the manufacture). The process then holds at decision block 344 until the timer has expired. Once the timer has expired, the process proceeds to process block 346, where control system 300 causes actuators 282 to open roof vents 50 to purge the fumigant. At decision block 348, control system 300 monitors concentration of the fumigant in grain bin 12 using one or more sensors until a second threshold concentration that is safe for exposure is reached. Once the second threshold concentration is reached, the process proceeds to process block 350, where control system 300 causes actuator(s) 282 to close roof vents 50 and triggers release of a preservative (e.g. CO2) into grain bin 12 to prolong the shelf life of the commodity. The automated operations performed by control system 300 in this illustrative example, avoid numerous manual tasks by the user. Moreover, in one or more arrangements, control system 300 may perform many operations at the same time (e.g., closing multiple roof vents 50 simultaneously), thereby reducing overall time to prepare the commodity for storage.

From the above discussion it will be appreciated that the self-opening roof vent system presented herein improves upon the state of the art. More specifically, and without limitation, it will be appreciated that in one or more arrangements the self-opening roof vent system presented herein: is durable; is easy to manufacture; is relatively inexpensive; has a robust design; is high quality; is easy to install; can be installed using conventional equipment and tools; prevents entry of water; reduces grain spoilage; reduces grain bin corrosion; facilitates treatment of grain with gases; can be used with any grain bin; extends the useful life of a grain bin; has a long useful life; is easy to use; and/or uses a single pull for opening and closing the roof vent.

It will be appreciated by those skilled in the art that other various modifications could be made to the device without parting from the spirit and scope of this disclosure. All such modifications and changes fall within the scope of the claims and are intended to be covered thereby.

What is claimed:

1. A roof vent system for a grain storage device, comprising:
   a roof panel;
   the roof panel having an opening therein;
   a lid operatively connected to the roof panel adjacent the opening;
   the lid configured to move between an open position, wherein the opening in the roof panel is uncovered by the lid, and a closed position, wherein the opening in the roof panel is covered by the lid;
   a bias member;
   the bias member operatively connected to the roof panel and the lid;
   the bias member configured to apply a bias force to the lid; and
   wherein the bias force of the bias member is configured to automatically move the lid to the open position;
   a lever connected to the lid;
   wherein when the lever is pulled down with a force greater than the bias force of the bias member, the lid is moved to the closed position;
   wherein the lever is configured to extend beyond an edge of the roof panel.

2. A roof vent system for a grain storage device comprising:
   a roof panel;
   the roof panel having an opening therein;
   a lid operatively connected to the roof panel adjacent the opening;
   the lid configured to move between an open position, wherein the opening in the roof panel is uncovered by the lid, and a closed position, wherein the opening in the roof panel is covered by the lid;
   a bias member;

the bias member operatively connected to the roof panel and the lid;

the bias member configured to apply a bias force to the lid;

wherein the bias force of the bias member is configured to automatically move the lid to the open position;

a sealing member attached to a bottom surface of the lid; and wherein the sealing member is configured to provide a seal between the lid and the roof panel when the lid is moved to the closed position.

3. The system of claim 2, wherein the seal is an airtight seal between the lid and the roof panel when the lid is moved to the closed position.

4. The system of claim 2, wherein the seal is a completely airtight seal between the lid and the roof panel when the lid is moved to the closed position.

5. The system of claim 1, further comprising a pull having one end operably connected to the lid; and wherein when the pull is pulled down with a force greater than the bias force of the bias member, the lid is moved to the closed position.

6. A roof vent system for a grain storage device, comprising:

a roof panel;

the roof panel having an opening therein;

a lid operatively connected to the roof panel adjacent the opening;

the lid configured to move between an open position, wherein the opening in the roof panel is uncovered by the lid, and a closed position, wherein the opening in the roof panel is covered by the lid;

a bias member;

the bias member operatively connected to the roof panel and the lid;

the bias member configured to apply a bias force to the lid; and wherein the bias force of the bias member is configured to automatically move the lid to the open position;

a pull having a first end and a second end;

wherein the first end of the pull is operably connected to the lid;

a control lever;

wherein the control lever is operably connected to the second end of the pull;

wherein the control lever is movable between an upper position and a lower position; and wherein when the control lever is pulled down to the lower position with a force greater than the bias force of the bias member, the lid is moved to the closed position.

7. A roof vent system for a grain storage device, comprising:

a roof panel;

the roof panel having an opening therein;

a lid operatively connected to the roof panel adjacent the opening;

the lid configured to move between an open position, wherein the opening in the roof panel is uncovered by the lid, and a closed position, wherein the opening in the roof panel is covered by the lid;

a bias member;

the bias member operatively connected to the roof panel and the lid;

the bias member configured to apply a bias force to the lid; and wherein the bias force of the bias member is configured to automatically move the lid to the open position;

a pull having a first end and a second end;

wherein the first end of the pull is operably connected to the lid;

an over center lever;

wherein the over center lever is operably connected to the second end of the pull;

wherein the over center lever is movable between an upper position and a lower position; and wherein when the over center lever is pulled down to the lower position with a force greater than the bias force of the bias member, the lid is moved to the closed position.

8. A roof vent system for a grain storage device, comprising:

a roof panel of the grain storage device;

the roof panel having an opening therein;

a lid operatively connected to the roof panel adjacent the opening;

the lid configured to move between an open position, wherein the opening in the roof panel is uncovered by the lid, and a closed position, wherein the opening in the roof panel is covered by the lid;

a bias member;

the bias member operatively connected to the roof panel and the lid;

the bias member configured to apply a bias force to the lid; and wherein the bias force of the bias member is configured to automatically move the lid to the open position;

a lever connected to the lid;

a hinge member connected to the roof panel;

wherein the lever is connected to the hinge member at a pivot point;

wherein the roof panel includes ribs along sides of the roof panel;

an elongated member attached to and extending between the ribs; and wherein the elongated member is positioned over the hinge member.

9. A roof vent system for a grain storage device, comprising:

a roof panel;

the roof panel having an opening therein;

a lid operatively connected to the roof panel adjacent the opening;

the lid configured to move between an open position, wherein the opening in the roof panel is uncovered by the lid, and a closed position, wherein the opening in the roof panel is covered by the lid;

a bias member;

the bias member operatively connected to the roof panel and the lid;

the bias member configured to apply a bias force to the lid; and wherein the bias force of the bias member is configured to automatically move the lid to the open position;

a ring attached to the roof panel;

a lip attached to the lid; and wherein when the lid is moved to the closed position, the ring is positioned within the lip.

10. A roof vent system for a grain storage device, comprising:
a roof panel;
the roof panel having an opening therein;
a lid operatively connected to the roof panel adjacent the opening;
the lid configured to move between an open position, wherein the opening in the roof panel is at least partially uncovered by the lid, and a closed position, wherein the opening in the roof panel is covered by the lid;
a sealing member attached to a bottom side of the lid; and
wherein the sealing member is configured to provide a seal between the lid and the roof panel when the lid is moved to the closed position;
a ring attached to the roof panel;
an actuator operably connected to the lid; and
a control system communicatively connected to the actuator;
wherein the control system is configured to cause the actuator to move the lid between the open position and the closed position in response to user input.

11. The system of claim 10, wherein the sealing member is configured to provide an airtight seal between the lid and the roof panel when the lid is moved to the closed position.

12. The system of claim 10, wherein the sealing member is configured to provide a completely airtight seal between the lid and the roof panel when the lid is moved to the closed position.

13. A roof vent system for a grain storage device, comprising:
a roof panel;
the roof panel having an opening therein;
a lid operatively connected to the roof panel adjacent the opening;
the lid configured to move between an open position, wherein the opening in the roof panel is at least partially uncovered by the lid, and a closed position, wherein the opening in the roof panel is covered by the lid;
a sealing member attached to a bottom side of the lid; and
wherein the sealing member is configured to provide a seal between the lid and the roof panel when the lid is moved to the closed position;
a ring attached to the roof panel;
wherein the sealing member is a compressible material; and
wherein when the lid is moved to the closed position, the ring is pressed into the sealing member.

14. The system of claim 13, further comprising;
a lip attached to the lid; and
wherein when the lid is moved to the closed position, the ring is positioned within the lip.

15. A roof vent system for a grain storage device, comprising:
a roof panel:
the roof panel having an opening therein;
a lid operatively connected to the roof panel adjacent the opening;
the lid configured to move between an open position, wherein the opening in the roof panel is at least partially uncovered by the lid, and a closed position, wherein the opening in the roof panel is covered by the lid;
a sealing member attached to a bottom side of the lid; and
wherein the sealing member is configured to provide a seal between the lid and the roof panel when the lid is moved to the closed position
a bias member;
the bias member operatively connected to the roof panel and the lid;
the bias member configured to provide a bias force; and
wherein the bias force of the bias member is configured to automatically move the lid to the open position.

16. A roof vent system for a grain storage device, comprising:
a roof panel:
the roof panel having an opening therein;
a lid operatively connected to the roof panel adjacent the opening;
the lid configured to move between an open position, wherein the opening in the roof panel is at least partially uncovered by the lid, and a closed position, wherein the opening in the roof panel is covered by the lid;
a sealing member attached to a bottom side of the lid; and
wherein the sealing member is configured to provide a seal between the lid and the roof panel when the lid is moved to the closed position;
a lever connected to the lid; and
wherein when the lever is pulled down, the lid is moved to the closed position.

17. The system of claim 16, wherein the lever is configured to extend beyond an edge of the roof panel.

18. The system of claim 10, further comprising:
the control system including a sensor;
wherein the control system is configured to cause the actuator to move the lid between the open position and the closed position in response to data from the sensor.

19. A grain bin system, comprising:
a cylindrical sidewall formed of a plurality of sheets aligned in a plurality of rings;
a roof comprising a plurality of panels;
wherein at least one panel of the plurality of panels has an opening;
a roof vent positioned in the opening and attached to the at least one panel;
wherein the roof vent includes a lid operatively connected to the at least one panel adjacent the opening;
wherein the lid is configured to move between an open position, wherein the opening in the at least one panel is at least partially uncovered by the lid, and a closed position,
wherein the opening in the at least one panel is covered by the lid;
wherein the roof vent includes a bias member;
wherein the bias member is operatively connected to the at least one panel and the lid;
wherein the bias member is configured to apply a bias force to the lid; and
wherein the bias force of the bias member is configured to automatically move the lid to the open position.

20. The system of claim 19, further comprising a lever connected to the lid; and wherein when the lever is pulled down with a force greater than the bias force of the bias member, the lid is moved to the closed position.

21. The system of claim 19, further comprising a lever connected to the lid; wherein when the lever is pulled down with a force greater than the bias force of the bias member, the lid is moved to the closed position; and wherein the lever is configured to extend beyond an edge of the at least one panel.

22. The system of claim 19, further comprising a sealing member attached to a bottom surface of the lid; and
wherein the sealing member is configured to provide a seal between the lid and the at least one panel when the lid is moved to the closed position.

23. The system of claim 19, further comprising a sealing member attached to a bottom surface of the lid; and
wherein the sealing member is configured to provide an airtight seal between the lid and the at least one panel when the lid is moved to the closed position.

24. The system of claim 19, further comprising a sealing member attached to a bottom surface of the lid; and
wherein the sealing member is configured to provide a completely airtight seal between the lid and the at least one panel when the lid is moved to the closed position.

25. The system of claim 19, further comprising a pull having one end operably connected to the lid; and
wherein when the pull is pulled down with a force greater than the bias force of the bias member, the lid is moved to the closed position.

26. The system of claim 19, further comprising:
a pull having a first end and a second end;
wherein the first end of the pull is operably connected to the lid;
a control lever attached to the cylindrical sidewall;
wherein the control lever is operably connected to the second end of the pull;
wherein the control lever is movable between an upper position and a lower position; and
wherein when the control lever is pulled down to the lower position with a force greater than the bias force of the bias member, the lid is moved to the closed position.

27. The system of claim 19, further comprising:
a pull having a first end and a second end;
wherein the first end of the pull is operably connected to the lid;
an over center lever attached to the cylindrical sidewall;
wherein the over center lever is operably connected to the second end of the pull;
wherein the over center lever is movable between an upper position and a lower position; and
wherein when the over center lever is pulled down to the lower position with a force greater than the bias force of the bias member, the lid is moved to the closed position.

28. The system of claim 19, further comprising:
a lever connected to the lid;
a hinge member operably connected to the roof;
wherein the lever is connected to the hinge member at a pivot point;
wherein the at least one panel includes ribs along sides of the at least one panel;
an elongated member attached to and extending between the ribs; and
wherein the elongated member is positioned over the hinge member.

29. The system of claim 19, further comprising;
a ring attached to the at least one panel;
a lip attached to the lid; and
wherein when the lid is moved to the closed position, the ring is positioned within the lip.

30. The system of claim 19, wherein the plurality of panels are overlapping.

31. A roof vent system for a grain storage device, comprising:
a roof panel;
the roof panel having an opening therein;
a lid operatively connected to the roof panel adjacent the opening;
the lid configured to move between an open position, wherein the opening in the roof panel is uncovered by the lid, and a closed position, wherein the opening in the roof panel is covered by the lid;
an actuator assembly;
the actuator assembly operatively connected to the roof panel and the lid;
the actuator assembly configured to apply a bias force to move the lid from the closed position to the open position; and
wherein the bias force of the actuator assembly is configured to automatically move the lid to the open position;
a sealing member attached to a bottom surface of the lid; and
wherein the sealing member is configured to provide a seal between the lid and the roof panel when the lid is moved to the closed position.

32. The system of claim 31, wherein the actuator assembly includes one or more springs, one or more gas pistons, one or more gas springs, one or more hydraulic pistons, one or more actuators, one or more solenoids, one or more motors, or one or more pneumatic members.

33. The system of claim 31, the actuator assembly configured to apply a bias force to move the lid from the closed position to the open position in response to user input.

34. A roof vent system for a grain storage device comprising:
a roof panel;
the roof panel having an opening therein;
a lid operatively connected to the roof panel adjacent the opening;
the lid configured to move between an open position, wherein the opening in the roof panel is uncovered by the lid, and a closed position, wherein the opening in the roof panel is covered by the lid;
a force generator;
the force generator operatively connected to the roof panel and the lid;
the force generator configured to apply a bias force to the lid;
wherein the bias force of the force generator is configured to automatically move the lid to the open position;
a sealing member attached to a bottom surface of the lid; and
wherein the sealing member is configured to provide a seal between the lid and the roof panel when the lid is moved to the closed position.

35. A roof vent system for a grain storage device comprising:
a roof panel;
the roof panel having an opening therein;
a lid operatively connected to the roof panel adjacent the opening;
the lid configured to move between an open position, wherein the opening in the roof panel is uncovered by the lid, and a closed position, wherein the opening in the roof panel is covered by the lid;
a force generator;
the force generator selected from a group consisting of one or more springs, one or more gas pistons, one or more gas springs, one or more hydraulic pistons, one or more actuators, one or more solenoids, one or more motors, one or more pneumatic members;
the force generator operatively connected to the roof panel and the lid;
the force generator configured to apply a bias force to the lid;
wherein the bias force of the force generator is configured to automatically move the lid to the open position;
a sealing member attached to a bottom surface of the lid; and
wherein the sealing member is configured to provide a seal between the lid and the roof panel when the lid is moved to the closed position.

* * * * *